US012176196B2

(12) United States Patent
Wysocki et al.

(10) Patent No.: US 12,176,196 B2
(45) Date of Patent: Dec. 24, 2024

(54) SURFACE-INDUCED DISSOCIATION DEVICES AND METHODS

(71) Applicant: Ohio State Innovation Foundation, Columbus, OH (US)

(72) Inventors: Vicki Wysocki, Columbus, OH (US); Dalton Snyder, Columbus, OH (US); Benjamin Jones, Columbus, OH (US); Alyssa Stiving, Columbus, OH (US); Joshua Gilbert, Columbus, OH (US); Zachary Vanaernum, Columbus, OH (US); Sophie Harvey-Bernier, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 488 days.

(21) Appl. No.: 17/431,299

(22) PCT Filed: Dec. 15, 2019

(86) PCT No.: PCT/US2019/066427
§ 371 (c)(1),
(2) Date: Aug. 16, 2021

(87) PCT Pub. No.: WO2020/167372
PCT Pub. Date: Aug. 20, 2020

(65) Prior Publication Data

US 2022/0130654 A1 Apr. 28, 2022

Related U.S. Application Data

(60) Provisional application No. 62/914,584, filed on Oct. 14, 2019, provisional application No. 62/806,742, filed on Feb. 15, 2019.

(51) Int. Cl.
*H01J 49/00* (2006.01)
*H01J 49/06* (2006.01)
(Continued)

(52) U.S. Cl.
CPC ........ *H01J 49/0068* (2013.01); *H01J 49/061* (2013.01); *H01J 49/066* (2013.01);
(Continued)

(58) Field of Classification Search
CPC .... H01J 49/0068; H01J 49/061; H01J 49/066; H01J 49/38; H01J 49/4225; H01J 49/426; H01J 49/062
See application file for complete search history.

(56) References Cited

U.S. PATENT DOCUMENTS 5,026,987 A * 6/1991 Bier .................... H01J 49/0068 250/281
6,670,606 B2 * 12/2003 Verentchikov ........ H01J 49/065 250/397

(Continued)

OTHER PUBLICATIONS

European Patent Office. Extended European Search Report dated Oct. 12, 2022. European Patent Application No. 19914830.5. 8 pages.

(Continued)

*Primary Examiner* — David A Vanore
(74) *Attorney, Agent, or Firm* — Meunier Carlin & Curfman LLC

(57) ABSTRACT

Devices and methods for surface-induced association are disclosed herein. According to one embodiment, a device for surface-induced dissociation (SID) includes a collision surface and a deflector configured to guide precursor ions from a pre-SID region to the collision surface. In some embodiments, an extractor extracts ions off the collision surface after collision with the collision surface. In some embodiments, an RF device can collect and/or transmit the extracted ions. In some embodiments, an ion funnel guides product ions resulting from collision with the collision surface to a post-SID region. Some aspects of the disclosure are directed (Continued)

to methods for surface-induced dissociation, which may in some embodiments include using of a split lens or an ion funnel.

46 Claims, 16 Drawing Sheets

(51) Int. Cl.
*H01J 49/38* (2006.01)
*H01J 49/42* (2006.01)

(52) U.S. Cl.
CPC .......... *H01J 49/38* (2013.01); *H01J 49/4225* (2013.01); *H01J 49/426* (2013.01)

(56) References Cited

U.S. PATENT DOCUMENTS

| | | | | |
|---|---|---|---|---|
| 6,744,040 | B2 * | 6/2004 | Park | H01J 49/063 250/281 |
| 6,977,370 | B1 * | 12/2005 | Weinberger | G01N 33/6851 436/86 |
| 7,163,803 | B2 * | 1/2007 | Hamon | C07K 1/12 435/24 |
| 7,183,542 | B2 * | 2/2007 | Mordehai | H01J 49/063 250/288 |
| 10,056,244 | B1 * | 8/2018 | Quarmby | H01J 49/0036 |
| 11,099,153 | B1 * | 8/2021 | Kovtoun | G01N 27/622 |
| 2001/0032929 | A1 * | 10/2001 | Fuhrer | H01J 49/06 250/281 |
| 2005/0189486 | A1 * | 9/2005 | Fuhrer | H01J 49/004 250/287 |
| 2006/0138320 | A1 * | 6/2006 | Bateman | H01J 49/0031 250/281 |
| 2007/0278397 | A1 * | 12/2007 | Bateman | H01J 49/062 250/296 |
| 2009/0072136 | A1 * | 3/2009 | Pringle | H01J 49/4235 250/290 |
| 2021/0225625 | A1 * | 7/2021 | Cooks | H01J 49/0031 |
| 2022/0130654 | A1 * | 4/2022 | Wysocki | H01J 49/426 |

OTHER PUBLICATIONS

Watson, J.T. et al. "Introduction to mass spectrometry: instrumentation, applications, and strategies for data interpretation." Jan. 1, 2007. John Wiley & Sons, Ltd. Wiley, Chichester, XP055389637, ISBN: 978-0-470-51634-8. pp. 53-172.

International Search Report and Written Opinion issued in PCT/US2019/066427, mailed Mar. 2, 2020, 11 pages.

Allen, Samuel J., Rachel M. Eaton, and Matthew F. Bush. "Analysis of native-like ions using structures for lossless ion manipulations." Analytical chemistry 88.18 (2016): 9118-9126.

Anthony, Staci N., Deven L. Shinholt, and Martin F. Jarrold. "A simple electrospray interface based on a DC ion carpet." International Journal of Mass Spectrometry 371 (2014): 1-7.

Belov, Mikhail E., et al. "From protein complexes to subunit backbone fragments: a multi-stage approach to native mass spectrometry." Analytical chemistry 85.23 (2013): 11163-11173.

Benesch, Justin LP, et al. "Tandem mass spectrometry reveals the quaternary organization of macromolecular assemblies." Chemistry & biology 13.6 (2006): 597-605.

Blackwell, Anne E., et al. "Revealing the quaternary structure of a heterogeneous noncovalent protein complex through surface-induced dissociation." Analytical chemistry 83.8 (2011): 2862-2865.

Brodbelt, Jennifer S. "Ion activation methods for peptides and proteins." Analytical chemistry 88.1 (2016): 30-51.

Busch, Florian, et al. "Localization of protein complex bound ligands by surface-induced dissociation high-resolution mass spectrometry." Analytical chemistry 90.21 (2018): 12796-12801.

Chorush, Russell A., et al. "Surface-induced dissociation of multiply-protonated proteins." Analytical chemistry 67.6 (1995): 1042-1046.

Felitsyn, Natalia, Elena N. Kitova, and John S. Klassen. "Thermal decomposition of a gaseous multiprotein complex studied by black-body infrared radiative dissociation. Investigating the origin of the asymmetric dissociation behavior." Analytical Chemistry 73.19 (2001): 4647-4661.

Fenn, John B., et al. "Electrospray ionization for mass spectrometry of large biomolecules." Science 246.4926 (1989): 64-71.

Fort, Kyle L., et al. "Expanding the structural analysis capabilities on an Orbitrap-based mass spectrometer for large macromolecular complexes." Analyst 143.1 (2018): 100-105.

Galhena, Asiri S., et al. "Surface-induced dissociation of peptides and protein complexes in a quadrupole/time-of-flight mass spectrometer." Analytical chemistry 80.5 (2008): 1425-1436.

Ganem, Bruce, Yu Tsyr Li, and Jack D. Henion. "Detection of noncovalent receptor-ligand complexes by mass spectrometry." Journal of the American Chemical Society 113.16 (1991): 6294-6296.

Giles, Kevin, et al. "Applications of a travelling wave-based radio-frequency-only stacked ring ion guide." Rapid Communications in Mass Spectrometry 18.20 (2004): 2401-2414.

Harvey, Sophie R., et al. "Relative interfacial cleavage energetics of protein complexes revealed by surface collisions." Proceedings of the National Academy of Sciences 116.17 (2019): 8143-8148.

Heck, Albert JR. "Native mass spectrometry: a bridge between interactomics and structural biology." Nature methods 5.11 (2008): 927-933.

Jones, Christopher M., et al. "Symmetrical gas-phase dissociation of noncovalent protein complexes via surface collisions." Journal of the American Chemical Society 128.47 (2006): 15044-15045.

Katta, Viswanatham, and Brian T. Chait. "Observation of the heme-globin complex in native myoglobin by electrospray-ionization mass spectrometry." Journal of the American Chemical Society 113.22 (1991): 8534-8535.

Kleckner, Ian R., Paul Gollnick, and Mark P. Foster. "Mechanisms of allosteric gene regulation by NMR quantification of microsecond-millisecond protein dynamics." Journal of molecular biology 415.2 (2012): 372-381.

Laganowsky, Arthur, et al. "Mass spectrometry of intact membrane protein complexes." Nature protocols 8.4 (2013): 639-651.

Lanucara, Francesco, et al. "The power of ion mobility-mass spectrometry for structural characterization and the study of conformational dynamics." Nature chemistry 6.4 (2014): 281-294.

Leney, Aneika C., and Albert JR Heck. "Native mass spectrometry: what is in the name?. " Journal of the American Society for Mass Spectrometry 28.1 (2016): 5-13.

Li, Huilin, et al. "An integrated native mass spectrometry and top-down proteomics method that connects sequence to structure and function of macromolecular complexes." Nature chemistry 10.2 (2018): 139-148.

Lippens, Jennifer L., et al. "Fourier transform-ion cyclotron resonance mass spectrometry as a platform for characterizing multimeric membrane protein complexes." Journal of The American Society for Mass Spectrometry 29.1 (2017): 183-193.

Ma, Xin, Mowei Zhou, and Vicki H. Wysocki. "Surface induced dissociation yields quaternary substructure of refractory noncovalent phosphorylase B and glutamate dehydrogenase complexes." Journal of the American Society for Mass Spectrometry 25.3 (2014): 368-379.

O'Brien, John P., et al. "Characterization of native protein complexes using ultraviolet photodissociation mass spectrometry." Journal of the American Chemical Society 136.37 (2014): 12920-12928.

Quintyn, Royston S., et al. "Surface-induced dissociation mass spectra as a tool for distinguishing different structural forms of gas-phase multimeric protein complexes." Analytical chemistry 87.23 (2015): 11879-11886.

Quintyn, Royston S., Jing Yan, and Vicki H. Wysocki. "Surface-induced dissociation of homotetramers with D2 symmetry yields their assembly pathways and characterizes the effect of ligand binding." Chemistry & biology 22.5 (2015): 583-592.

(56) References Cited

OTHER PUBLICATIONS

Rose, Rebecca J., et al. "High-sensitivity Orbitrap mass analysis of intact macromolecular assemblies." Nature methods 9.11 (2012): 1084-1086.
Ruotolo, Brandon T., et al. "Ion mobility-mass spectrometry reveals long-lived, unfolded intermediates in the dissociation of protein complexes." Angewandte Chemie International Edition 46.42 (2007): 8001-8004.
Sahasrabuddhe, Aniruddha, et al. "Confirmation of intersubunit connectivity and topology of designed protein complexes by native MS." Proceedings of the National Academy of Sciences 115.6 (2018): 1268-1273.
Sauer, Evelyn, and Oliver Weichenrieder. "Structural basis for RNA 3'-end recognition by Hfq." Proceedings of the National Academy of Sciences 108.32 (2011): 13065-13070.
Song, Yang, et al. "Refining the structural model of a heterohexameric protein complex: Surface induced dissociation and ion mobility provide key connectivity and topology information." ACS central science 1.9 (2015): 477-487.
Syka, John EP, et al. "Peptide and protein sequence analysis by electron transfer dissociation mass spectrometry." Proceedings of the National Academy of Sciences 101.26 (2004): 9528-9533.
Van den Heuvel, Robert HH, and Albert JR Heck. "Native protein mass spectrometry: from intact oligomers to functional machineries." Current opinion in chemical biology 8.5 (2004): 519-526.
Vanaernum, Zachary L., et al. "Surface-induced dissociation of noncovalent protein complexes in an extended mass range orbitrap mass spectrometer." Analytical chemistry 91.5 (2019): 3611-3618.
Vogel, Jörg, and Ben F. Luisi. "Hfq and its constellation of RNA." Nature Reviews Microbiology 9.8 (2011): 578-589.
Wysocki, Vicki H., et al. "Surface-induced dissociation of small molecules, peptides, and non-covalent protein complexes." Journal of the American Society for Mass Spectrometry 19.2 (2011): 190-208.
Wysocki, Vicki H., et al. "Surface-induced dissociation shows potential to be more informative than collision-induced dissociation for structural studies of large systems." Journal of the American Society for Mass Spectrometry 19 (2008): 903-913.
Yan, Jing, et al. "Surface-induced dissociation of protein complexes in a hybrid Fourier transform ion cyclotron resonance mass spectrometer." Analytical chemistry 89.1 (2017): 895-901.
Zhang, Hao, et al. "Native electrospray and electron-capture dissociation in FTICR mass spectrometry provide top-down sequencing of a protein component in an intact protein assembly." Journal of the American Society for Mass Spectrometry 21.12 (2011): 1966-1968.
Zhou, Mowei, and Vicki H. Wysocki. "Surface induced dissociation: dissecting noncovalent protein complexes in the gas phase." Accounts of chemical research 47.4 (2014): 1010-1018.
Zhou, Mowei, et al. "Surface induced dissociation coupled with high resolution mass spectrometry unveils heterogeneity of a 211 kDa multicopper oxidase protein complex." Journal of The American Society for Mass Spectrometry 29.4 (2018): 723-733.
Zhou, Mowei, Shai Dagan, and Vicki H. Wysocki. "Impact of charge state on gas-phase behaviors of noncovalent protein complexes in collision induced dissociation and surface induced dissociation." Analyst 138.5 (2013): 1353-1362.
Zhou, Mowei, Shai Dagan, and Vicki H. Wysocki. "Protein subunits released by surface collisions of noncovalent complexes: nativelike compact structures revealed by ion mobility mass spectrometry." Angewandte Chemie International Edition 51.18 (2012): 4336-4339.

* cited by examiner

SURFACE-INDUCED DISSOCIATION DEVICES AND METHODS

CROSS-REFERENCE TO RELATED APPLICATIONS

This application is a national stage application filed under 35 U.S.C. § 371 of PCT/US2019/066427 filed Dec. 15, 2019, which claims priority to, and benefit under 35 U.S.C. § 119(e) of, U.S. Provisional Patent Application No. 62/914,584 filed Oct. 14, 2019, and U.S. Provisional Patent Application No. 62/806,742 filed Feb. 15, 2019, of which applications are hereby incorporated by reference herein in their entireties.

STATEMENT REGARDING GOVERNMENT SUPPORT

This invention was made with government support under contract/grant number GM128577 awarded by the National Institutes of Health and 1455654 awarded by the National Science Foundation. The government has certain rights in the invention.

BACKGROUND

Mass spectrometry is emerging as a powerful tool for structural biology. (8-10). The observation that the tertiary and quaternary structure of proteins and their complexes can be kinetically trapped after transfer from solution to the gas phase (11-13) through a combination of careful sample preparation (exchanging into a volatile buffer, e.g. ammonium acetate) and soft electrospray ionization (14) led to the eventual coining of the term “native mass spectrometry” (nMS). This was followed by the emergence of improved mass spectrometric technologies (e.g. ion mobility (15-17), surface-induced dissociation (18-20), ultraviolet photodissociation (21), Q-IM-TOFs (22), Fourier Transform Ion Cyclotron Resonance (FT-ICR) (23-27), and high mass ORBITRAPs (28, 29) for studying high-mass species.

Upon transfer to the gas phase, the intact mass of protein complexes can be measured with high accuracy (for ORBITRAPs and FT-ICRs), but complexes must be further probed in order to gain insight into complex stoichiometry, inter-subunit interaction strength and arrangement, and possible ligand binding, all of which influence protein function. Activation methods are useful for dissecting intact complexes into subunits. Electron-transfer dissociation (30) and ultraviolet photodissociation (21, 31) tend to dissociate proteins into small fragments (“top-down” covalent fragmentation) which are useful for sequencing and locating post-translational modifications and ligand binding sites but do not typically provide overall connectivity/topology information. Collision-induced dissociation (CID), the most common form of activation due to its widespread commercial availability, generally produces highly unfolded/restructured, highly charged monomers with complementary (n-1) mers. (17, 32, 33). While CID can provide direct stoichiometric (and mass) information, it generally does not give fragments consistent with inter-subunit connectivity and interaction strength, and the unfolding/restructuring of monomers is undesirable because native structure is not retained.

Surface-induced dissociation (SID), in which the collision target is a rigid, high-mass surface (usually coated with a fluorocarbon self-assembled monolayer but other coatings or untreated metal are acceptable for some precursors) rather than a small gas molecule, has been shown to generate more symmetrically charged fragments that are reminiscent of the three-dimensional structure of protein complexes, (18, 34, 35) in part because SID consists of a single collision with higher energy conversion versus many low energy collisions in CID. SID can provide a wealth of information, including overall conformational changes, (35-37) subunit interconnectivity (37-42) and interaction strength (43)(which can be used to constrain computer models) (43, 44), and subunit-ligand interactions. (45).

It is with respect to these and other considerations that the various embodiments described below are presented.

SUMMARY

In some aspects, the present disclosure relates to devices and methods for surface-induced dissociation (SID).

In one aspect, the present disclosure relates to a device for surface-induced dissociation (SID) which, in one embodiment, includes a collision surface, a deflector configured to guide precursor ions from a pre-SID region to the collision surface, and an extractor configured to extract ions off the collision surface after collision with the collision surface.

In some embodiments, the device also includes a radiofrequency (RF) device configured to collect and/or transmit the extracted ions.

In some embodiments, the collision surface, deflector, and extractor are arranged in a split lens configuration.

In some embodiments, the split lens comprised of the collision surface, deflector, and extractor has a total length along the ion optical axis of no more than 3.25 mm.

In some embodiments, a repulsive direct current (DC) voltage is applied to the deflector to guide the precursor ions into the collision surface.

In some embodiments, a DC voltage is applied to the collision surface.

In some embodiments, wherein an attractive DC voltage or a repulsive DC voltage is applied to the extractor.

In some embodiments, the collision surface is oriented parallel to an ion optical axis defined along the direction of ion movement through a mass spectrometer.

In some embodiments, the collision surface is tilted with respect to the ion optical axis.

In some embodiments, the collision surface is substantially flat, cylindrical, half-cylindrical, or conical.

In some embodiments, DC voltages are applied to the collision surface, deflector, and extractor.

In some embodiments, RF and DC voltages are applied to the RF device for collecting and/or transmitting ions after surface collision.

In some embodiments, the extracted ions are extracted directly into the RF device after surface collision.

In some embodiments, the RF device includes, at least in part, one or more of a multipole, a collision cell, a stacked ring ion guide, an ion funnel, an ion mobility cell, a 3D quadrupole ion trap, and a linear quadrupole ion trap.

In some embodiments, the split lens comprised of the collision surface, deflector, and extractor is operatively coupled to a Fourier transform ion cyclotron resonance (FT-ICR) cell.

In another aspect, the present invention relates to a method for surface-induced dissociation (SID) which, in one embodiment, includes guiding, by a deflector, precursor ions from a pre-SID region to a collision surface, and extracting, by an extractor, unfragmented precursors and fragment ions resulting from collision with the collision surface.

In some embodiments, the method includes applying selected direct current (DC) voltages to the collision surface, deflector, and extractor to cause the collisions of the precursor ions with the collision surface and extraction of the unfragmented precursors and fragment ions.

In some embodiments, the unfragmented precursors and fragment ions resulting from collision with the collision surface are extracted into a radiofrequency (RF) device, and the method further includes collecting and/or transmitting, by use of the RF device, the unfragmented precursors and fragment ions.

In some embodiments, the method also includes applying selected RF and DC voltages to the RF device to cause the collecting and/or transmitting of the extracted unfragmented precursors and fragment ions.

In some embodiments, the collision surface is oriented parallel to an ion optical axis defined along the direction of ion movement through a mass spectrometer.

In some embodiments, the collision surface is tilted with respect to the ion optical axis.

In some embodiments, the collision surface is flat, cylindrical, half-cylindrical, or conical.

In some embodiments, selected DC voltages are applied to the collision surface, deflector, and extractor.

In some embodiments, the extracted fragment ions are extracted directly into the RF device after surface collision.

In some embodiments, the RF device includes, at least in part, one or more of a multipole, a collision cell, a stacked ring ion guide, an ion funnel, an ion mobility cell, a 3D quadrupole ion trap, and a linear quadrupole ion trap.

In some embodiments, the deflector, collision surface, and extraction electrode are arranged in a split lens configuration that is operatively coupled to a Fourier transform ion cyclotron resonance (FT-ICR) cell.

In some embodiments, the precursor ions correspond to small molecules, lipids, fatty acids, peptides, sugars, metabolites, oligomers, nucleotides, polymers, or natural or designed and synthetic variants of the molecular classes.

In some embodiments, the precursor ions correspond to proteins, protein complexes, protein-small molecule complexes, RNA, protein-RNA complexes, protein-DNA complexes, lipid nanodiscs, antibodies, antibody-drug conjugates, DNA complexes, RNA complexes, viruses, or bacteria.

In some embodiments, the small molecules have a mass of about 800 Da or less.

In another aspect, the present disclosure relates to a device for surface-induced dissociation (SID) which, in one embodiment, includes a collision surface, a deflector configured to guide precursor ions from a pre-SID region to the collision surface, and a radiofrequency (RF) device configured to collect and/or transmit ions extracted directly into the RF device after collision with the collision surface.

In some embodiments, the collision surface and deflector are configured as a split lens.

In some embodiments, a repulsive direct current (DC) voltage is applied to the deflector to guide the precursor ions into the collision surface.

In some embodiments, a DC voltage is applied to the collision surface.

In some embodiments, the collision surface is oriented parallel to an ion optical axis defined along the direction of ion movement through a mass spectrometer.

In some embodiments, the collision surface is tilted with respect to the ion optical axis.

In some embodiments, the collision surface is substantially flat, cylindrical, half-cylindrical, or conical.

In some embodiments, a split lens comprised of the collision surface and deflector has a total length along the ion optical axis of no more than 3.25 mm.

In some embodiments, DC voltages are applied to the collision surface and deflector.

In some embodiments, RF and DC voltages are applied to the RF device for collecting and/or transmitting ions after surface collision.

In some embodiments, the RF device includes, at least in part, one or more of a multipole, a collision cell, a stacked ring ion guide, an ion funnel, an ion mobility cell, a 3D quadrupole ion trap, and a linear quadrupole ion trap.

In another aspect, the present disclosure relates to a method for surface-induced dissociation (SID) which, in one embodiment, guiding, by a deflector, precursor ions from a pre-SID region to a collision surface, and collecting and/or transmitting, by use of an RF device, unfragmented precursors and fragment ions extracted directly into the RF device after collision with the collision surface.

In some embodiments, the method includes applying selected direct current (DC) voltages to the surface and deflector to cause the collisions of the precursor ions with the collision surface and extraction of the unfragmented precursors and fragment ions.

In some embodiments, the method includes applying selected RF and DC voltages to the RF device to cause the collecting and/or transmitting of the unfragmented precursors and fragment ions.

In some embodiments, the collision surface is oriented parallel to an ion optical axis defined along the direction of ion movement through a mass spectrometer.

In some embodiments, the collision surface is tilted with respect to the ion optical axis.

In some embodiments, the collision surface is flat, cylindrical, half-cylindrical, or conical.

In some embodiments, selected DC voltages are applied to the collision surface and deflector.

In some embodiments, the RF device includes, at least in part, one or more of a multipole, a collision cell, a stacked ring ion guide, an ion funnel, an ion mobility cell, a 3D quadrupole ion trap, and a linear quadrupole ion trap.

In some embodiments, the precursor ions correspond to small molecules, lipids, fatty acids, peptides, sugars, metabolites, oligomers, nucleotides, polymers, or natural and/or designed and synthetic variants of the molecular classes.

In some embodiments, the precursor ions correspond to proteins, protein complexes, protein-small molecule complexes, RNA, protein-RNA complexes, protein-DNA complexes, lipid nanodiscs, antibodies, antibody-drug conjugates, DNA complexes, RNA complexes, viruses, or bacteria.

In some embodiments, the small molecules have a mass of about 800 Da or less.

In another aspect, the present disclosure relates to a device for surface-induced dissociation (SID) which, in one embodiment, includes a collision surface, a deflector configured to guide precursor ions from a pre-SID region to the collision surface, and an ion funnel configured to guide product ions resulting from collision with the collision surface to a post-SID region.

In some embodiments, electrical potentials are applied to a plurality of electrically tunable lenses of the ion funnel to guide the product ions post-collision.

In some embodiments, the collision surface and deflector have applied electrical properties such that the collision surface is attractive to precursor ions and the deflector is repulsive to precursor ions to guide the precursor ions to the collision surface.

In some embodiments, the ion funnel includes a first opening receiving the product ions and a second opening through which the product ions exit, and the first opening has a diameter that is larger than the diameter of the second opening.

In some embodiments, the precursor ions correspond to small molecules, lipids, fatty acids, peptides, sugars, metabolites, oligomers, nucleotides, polymers, or natural or designed and synthetic variants of the molecular classes.

In some embodiments, the precursor ions correspond to proteins, protein complexes, protein-small molecule complexes, RNA, protein-RNA complexes, protein-DNA complexes, lipid nanodiscs, antibodies, antibody-drug conjugates, DNA complexes, RNA complexes, viruses, or bacteria.

In some embodiments, the device is configured to be integrated into a mass spectrometer.

In some embodiments, the device is configured to be placed between two mass analyzers.

In some embodiments, the mass spectrometer is a multistage mass spectrometer with or without ion mobility.

In some embodiments, the mass spectrometer is a multistage mass spectrometer with at least one of collision, electron, and photon-based disassociation.

In some aspects, the present disclosure relates to a method for surface-induced dissociation (SID) which, in some embodiments, includes guiding, by a deflector, precursor ions from a pre-SID region to a collision surface, and guiding, by an ion funnel, product ions resulting from collision with the collision surface to a post-SID region.

In some embodiments, the method includes applying electrical potentials to the ion funnel to guide the product ions through the funnel post-collision.

In some embodiments, the method includes applying electrical properties to at least one of the collision surface and deflector such that the collision surface is attractive to precursor ions and the deflector is repulsive to precursor ions, to guide the precursor ions to the collision surface.

In some embodiments, the ion funnel includes a first opening receiving the product ions and a second opening through which the product ions exit, wherein the first opening has a diameter that is larger than the diameter of the second opening.

Other aspects and features according to the example embodiments of the present disclosure will become apparent to those of ordinary skill in the art, upon reviewing the following detailed description in conjunction with the accompanying figures.

BRIEF DESCRIPTION OF THE FIGURES

The accompanying drawings, which are incorporated in and constitute a part of this specification, illustrate embodiments and together with the description, serve to explain the principles of the disclosed technology.

FIG. 8A illustrates a perspective view of a split lens SID device. FIG. 8B illustrates components 618 of a split lens SID device. FIG. 8C illustrates a collision cell (main structure), and the location 620 of the split lens SID device. FIG. 8D illustrates a simulation of the path of ions through the device and collision cell. In these embodiments, the split lens SID device includes three electrodes and a PEEK spacer, and is small enough (3.25 mm length) to replace the endcap of a commercial collision cell. Simulations (view from top) of 100 ions (53 kDa, 10+) in 8D indicate high collection efficiency (>90%) after surface collision (SID 85 V) due to the presence of a trapping RF field directly behind the surface without any intermediate lenses. Spacer materials other than PEEK may be used in other embodiments of the present disclosure.

FIG. 9A illustrates a simulation result for embodiments implementing a split lens. FIG. 9B illustrates a simulation result for some embodiments implementing a TSCC under ‘ideal’ conditions. Parameters were as follows: number of ions, 1,000; ion mass, 53.22 kDa; ion charge, 10+; source position, Gaussian distribution with 0.2 mm standard deviation in the radial dimension; initial ion kinetic energy, Gaussian distribution with 25+/−5 (FWHM) eV; time-of-birth, uniform distribution between 0 and 5 microseconds; ion kinetic energy retention after surface collision, 5%+/−0%; reflection angle, specular+/−0°. The ion mass and charge after surface collision did not change during the simulation because the ion does not fragment until it is trapped in the collision cell. Survival percentages indicate which ions were successfully trapped in the collision cell.

DETAILED DESCRIPTION

Figure 1:
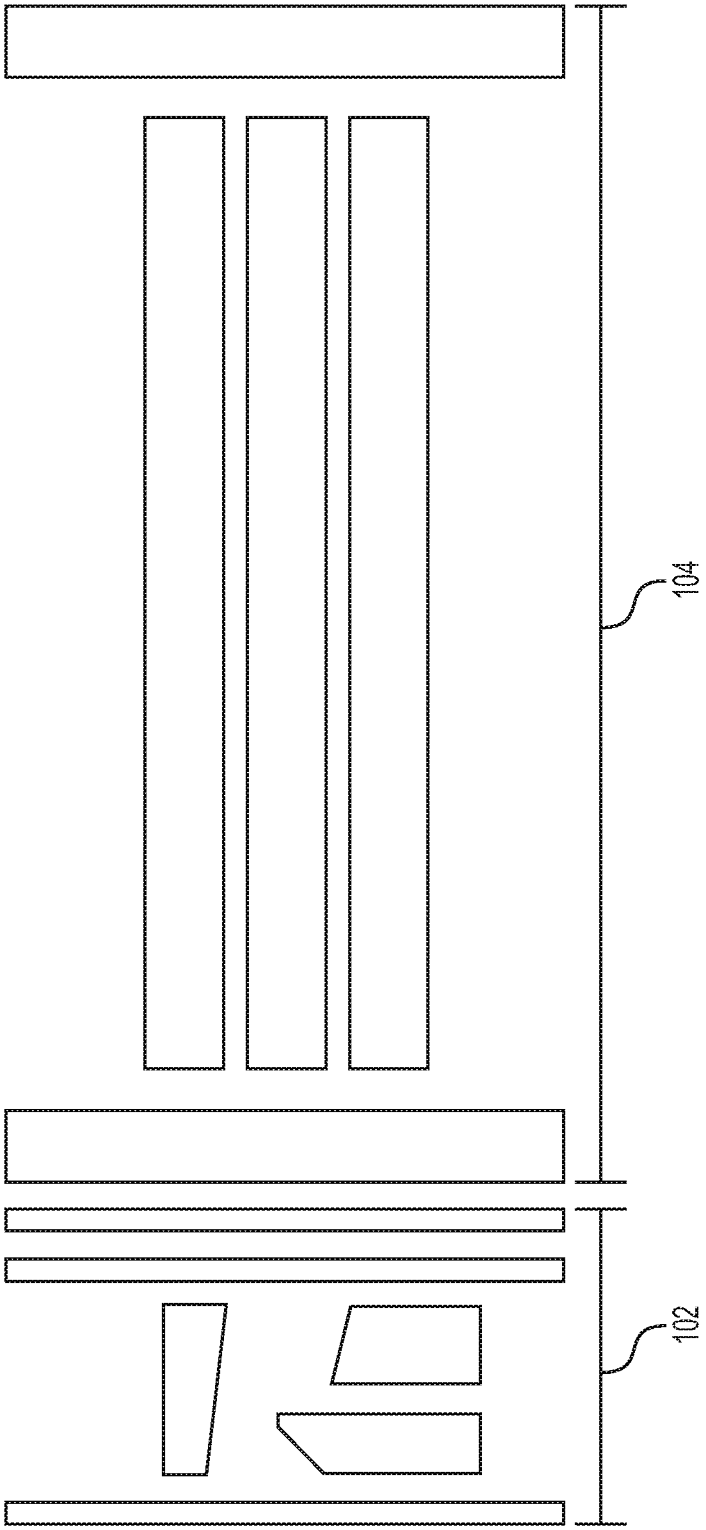
FIG. 1 illustrates a surface-induced dissociation device in accordance with an embodiment of the present disclosure, implemented in a 15 T FT-ICR mass spectrometer. According to an embodiment of the present disclosure, the device in FIG. 1 may be referred to as “Tilted Surface with Collision Cell” (TSCC). Some embodiments of the present disclosure may be referred to as, or with reference to, “split lens” designs, devices, and/or methods (see, e.g., FIG. 2). In some embodiments of the present disclosure, SID can be performed in an endcap electrode by implementing a triple split lens design (see FIG. 2).
Figure 2:
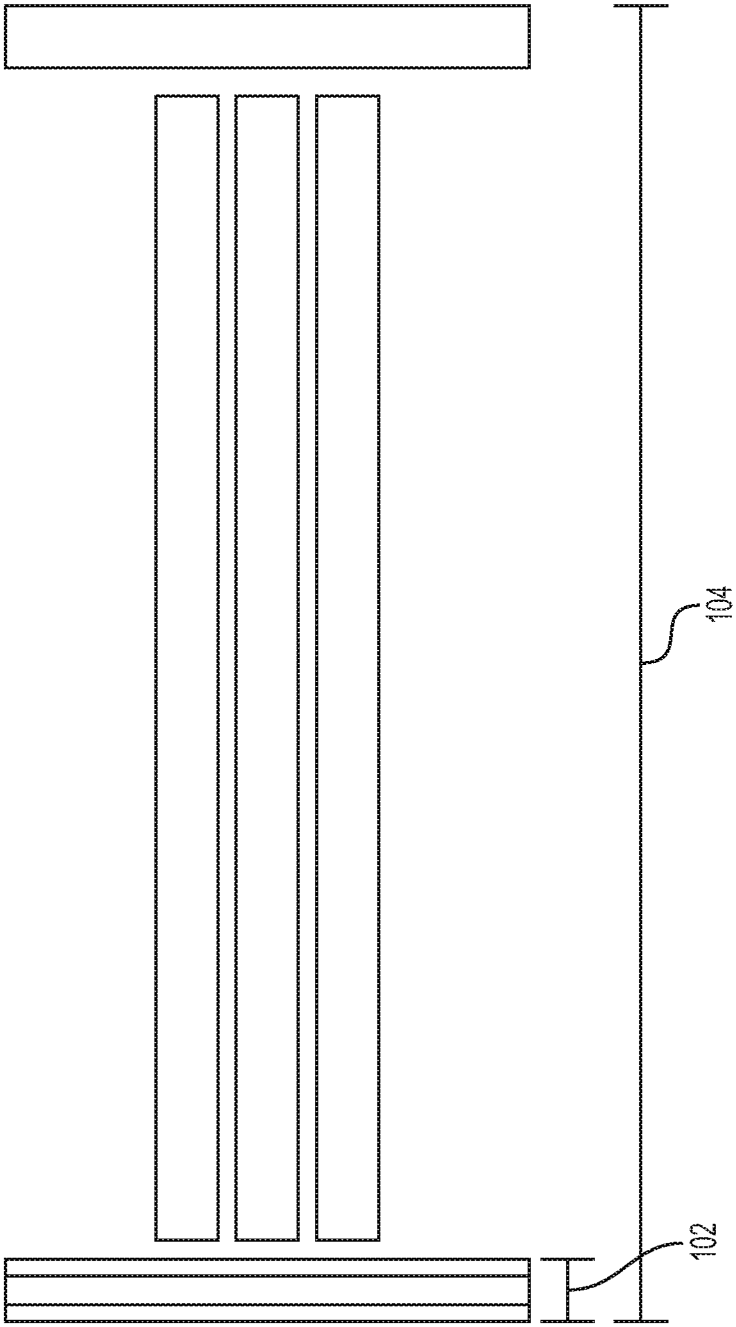
FIG. 2 illustrates a surface-induced dissociation device in a 15 T FT-ICR mass spectrometer, with the SID device 102 attached to a collision cell 104, with the collision cell used either for collection and transmission of precursors and product ions formed by SID or for performing collision-induced dissociation. Embodiments implementing a split lens design may be narrow enough to replace the existing endcap (not shown) of a commercially available collision cell 104.

In some aspects, the present disclosure relates to surface-induced dissociation (SID) devices and methods. Although example embodiments of the present disclosure are explained in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Certain values may be expressed in terms of ranges "from" one value "to" another value. When a range is expressed in terms of "from" a particular lower value "to" a particular higher value, or "from" a particular higher value "to" a particular lower value, the range includes the particular lower value and the particular higher value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "(n)" corresponds to the $n^{th}$ reference in the list. For example, (3) refers to the $3^{rd}$ reference in the list, namely VanAernum, Z. L.; Gilbert, J. D.; Belov, M. E.; Makarov, A. A.; Homing, S. R.; Wysocki, V. H. *Anal. Chem.* 2019, 91, 3611-3618. All references cited and discussed in this specification are incorporated herein by reference in their entireties and to the same extent as if each reference was individually incorporated by reference.

A detailed description of aspects of the present disclosure, in accordance with various example embodiments, will now be provided with reference to the accompanying drawings. The drawings form a part hereof and show, by way of illustration, specific embodiments and examples. In referring to the drawings, like numerals represent like elements throughout the several figures. Some experimental data are presented herein for purposes of illustration and should not be construed as limiting the scope of the present disclosure in any way or excluding any alternative or additional embodiments.

Precursor ions that impact the surface of an SID device may fragment and become product ions. Throughout the present disclosure, "product ions" may alternatively be referred to as "products," "fragments," or "fragment ions." Similarly, ions that interact with the surface may be referred to as "activated" or "activated ions." Precursor ions may also be referred to as "precursors" or "precursor complexes."

In some embodiments of the present disclosure, and generally with reference to FIG. 1, SID devices implement a Tilted Surface with Collision Cell (TSCC) design.

Figure 3:
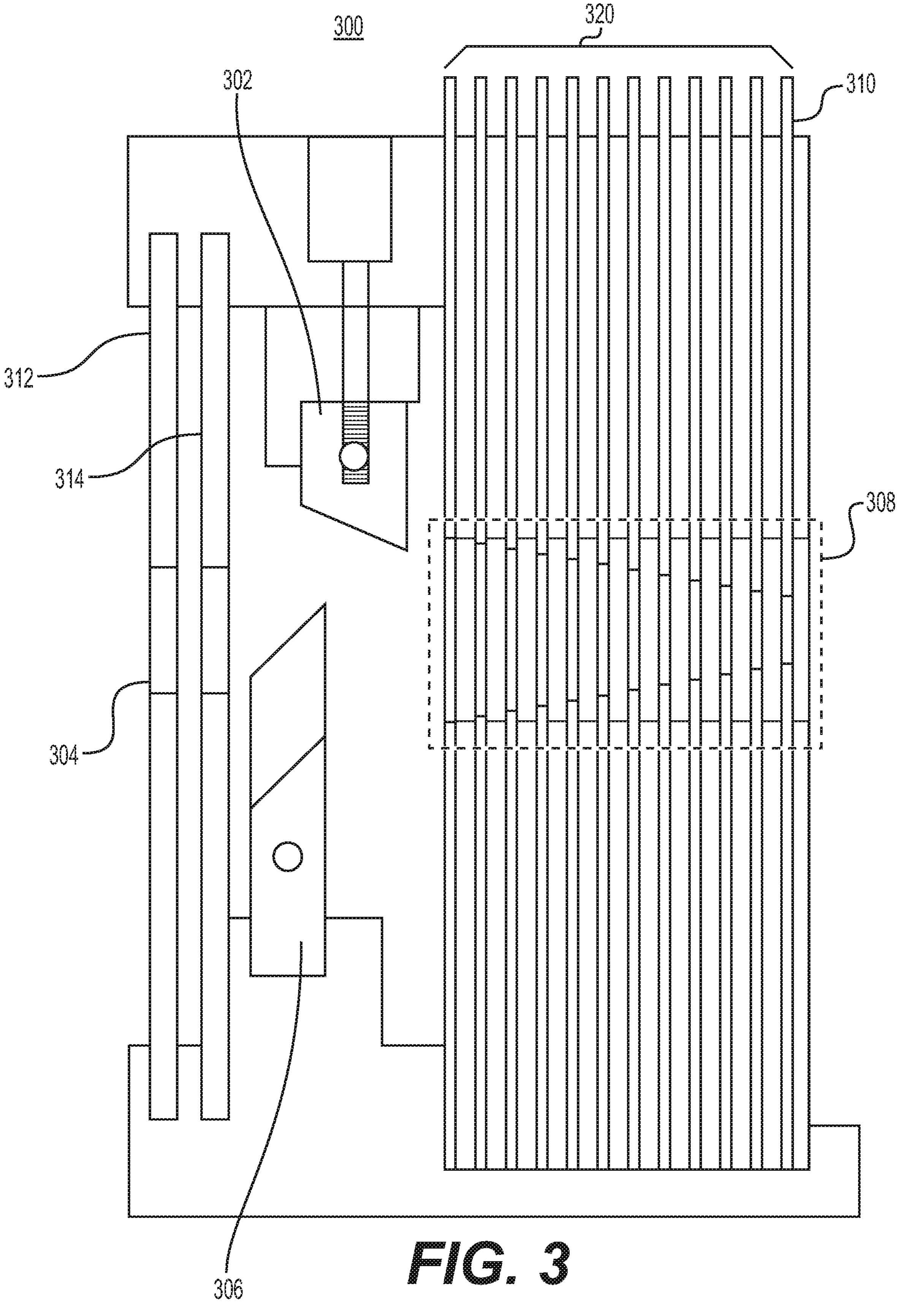
FIG. 3 is a cutaway view of a surface-induced dissociation (SID) device including an ion funnel, in accordance with one embodiment of the present disclosure.
Figure 4:
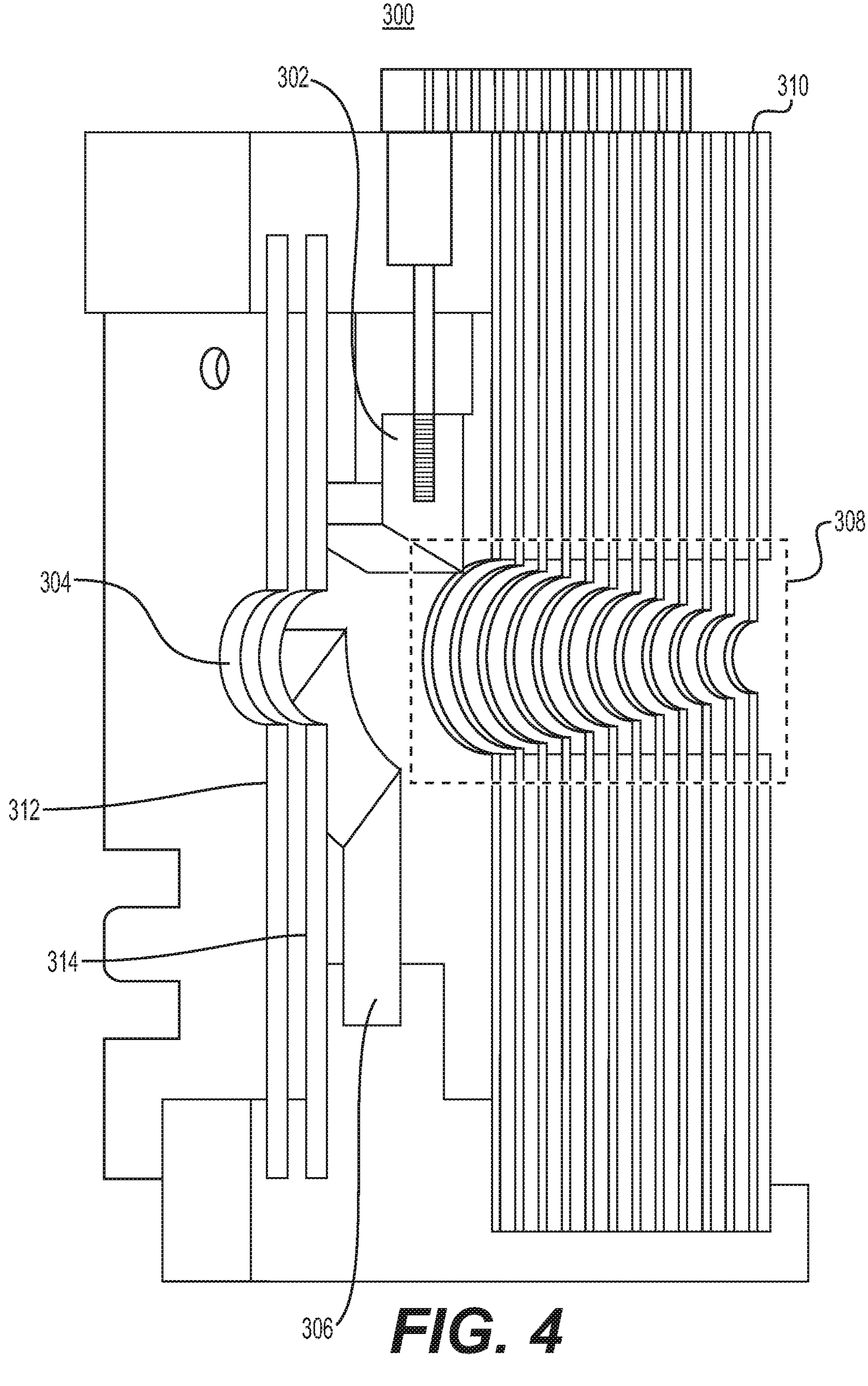
FIG. 4 is a cutaway perspective view illustrating an SID device including an ion funnel, in accordance with one embodiment of the present disclosure.
Figure 5:
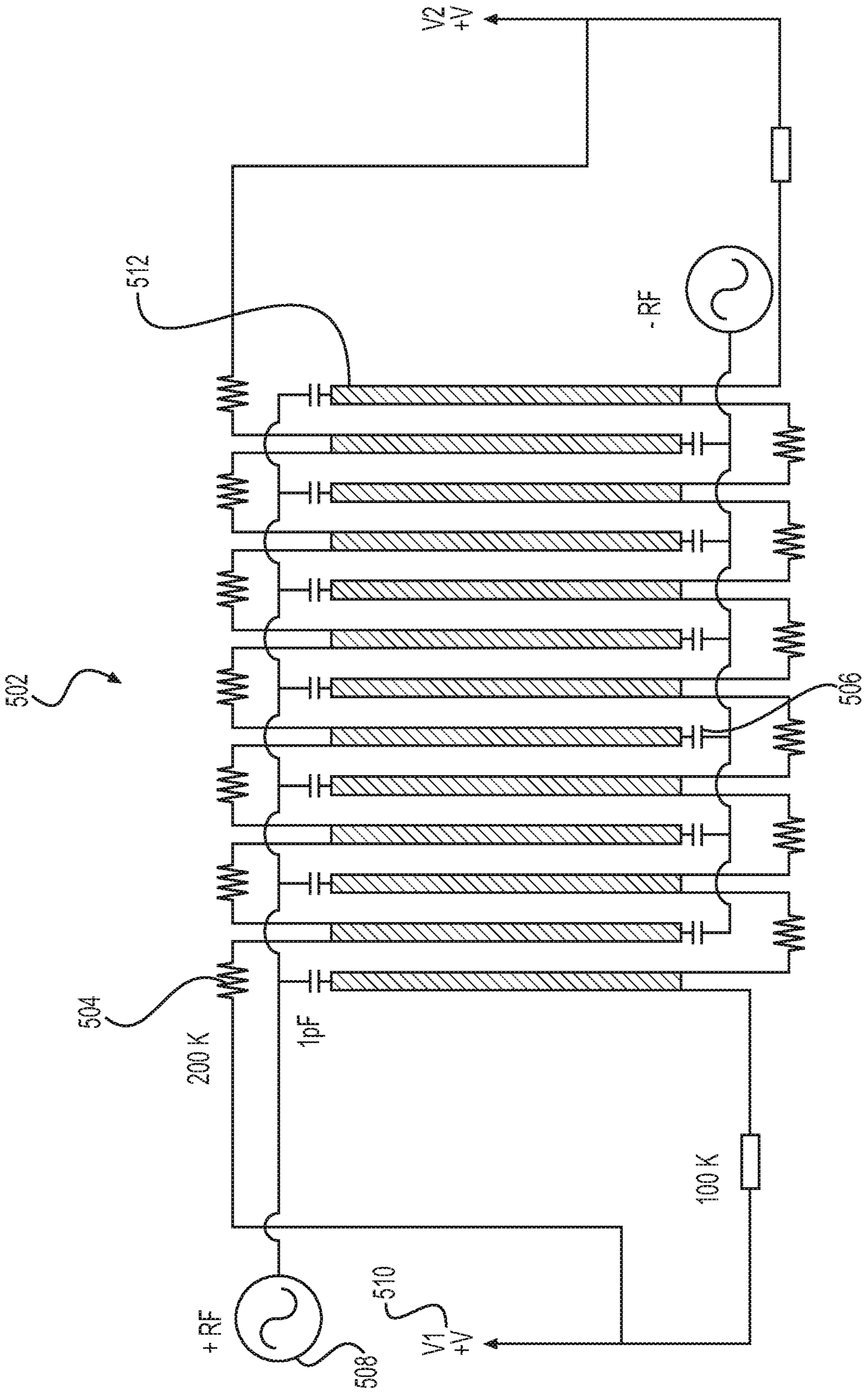
FIG. 5 is an electrical diagram for an ion funnel in accordance with some embodiments of the present disclosure.

In some embodiments of the present disclosure, and generally with reference to FIGS. 3-5, SID devices utilize optimal dimensions for an angled deflector lens 306 that guides the ions to the angled surface 302. The angled deflector lens 306 is incorporated with a final lens stack 320 acting as an ion funnel that collects and guides activated ions away from the surface, onto the original ion trajectory (e.g. within the mass spectrometer), and focuses them as they exit the device. In some embodiments, a SID device includes two entrance lenses 312, 314 for guiding ions from a pre-SID region to an angled deflector lens 306 that guides the ions to an angled collision surface. In some embodiments, after the ions collide with the surface 302, the resulting fragments are guided to a post-SID region by an RF ion funnel 308.

In some embodiments, the entrance lenses 312, 314, angled deflector lens 306, and/or ion funnel 308 can be configured to provide an arrangement for a "flythrough" mode, in which the ions are guided through the device 300 without activation, such that the device operates for mass spectrometry without additional ion activation. In some embodiments, the fragment ions and unfragmented precursor ions form an "ion packet," a group of ions. The ion funnel 308 according to some embodiments can take ions entering a large opening of the ion funnel 308 and focus the diffuse ion packet down to a smaller ion packet at the end of the ion funnel 308. In implementations of SID when working with large protein complexes, for example, products resulting from collision with the surface can have a large range of mass values, charge values, and kinetic energy values, making it difficult to efficiently capture all of them, or a high percentage of them, for example, all at once using a conventional DC-only lens stack. Devices having an ion funnel 308 in accordance with some embodiments described herein can overcome this challenge.

Among other advantages and benefits, embodiments described herein can provide for better transmission of ions into a small aperture at an entrance of a next stage of an instrument, for example. In accordance with some embodiments, SID devices disclosed herein may be configured to fit in line in a commercial mass spectrometer. In some embodiments, the device can be placed between two mass analyzers. For example, in some embodiments the device can be disposed between a quadrupole mass analyzer and a time of flight analyzer. In contrast to usability issues of conventional devices as described in some detail above, devices according to some embodiments described herein are easily set for simple ion transmission and for activation via a surface collision.

The following provides non-limiting examples of the masses of precursor complexes, charges of precursor ions, masses of product ions, and charges of product ions for large molecules (e.g., large protein complexes) utilized in various implementations of an SID device according to various embodiments of the present disclosure. In some embodiments, the masses of precursor ions can be from 53 kDa (53,000 g/mol) to 125 kDa (125,000 g/mol). In some embodiments, the masses of precursor complexes can be more than 125 kDa, and can in some embodiments be 1 MDa or more. In some embodiments, the masses of product ions can be from 13 kDa to 125 kDa. In some embodiments, the charges of precursor ions can be from 10+ to 23+. In some embodiments, the charges of product ions can be from 3+ to 23+.

The following provides non-limiting examples of masses of precursor complexes, charges of precursor ions, masses of product ions, and charges of product ions for small molecules (e.g., small molecule complexes) utilized in various implementations of an SID device according to various embodiments of the present disclosure. In some embodiments, the masses of precursor (intact) complexes can be from 92 Da (92 g/mol) to 321 Da (321 g/mol). In some embodiments, the charge of precursor ions can be 1+. In some embodiments, the mass of products can be from 54 Da to 321 Da (unfragmented precursor) and the charges of products can be 1+. It should be appreciated that respective values may vary from these and still be within the scope of the disclosure, and that values selected, utilized, produced, etc. depend on the desired implementations for the device(s) in accordance with embodiments disclosed herein.

Now referring specifically to FIGS. 3 and 4, these illustrations depict an example embodiment of an SID device 300 according to the present disclosure. In some embodiments, the entrance 304 comprises an entrance-1 and entrance-2. Entrance-1 312 and entrance-2 314 help to guide ions into the SID device 300 without causing unnecessary acceleration, in order to help prevent unwanted activation before collisions with the surface 302 and, for example, to help prevent protein unfolding that can change the structure of a system being studied. In the embodiment shown in FIG. 3, entrance-1 312 has a 5 mm inner diameter and entrance-2 314 has a 5 mm inner diameter. It should be appreciated, however, that these respective diameters may have different values, depending on the desired implementation. For example, in some embodiments, the inner diameter can be from 3 mm to 7 mm, and the thickness of the entrance lenses 312, 314 can be from 0.5 mm to 2 mm. The angled deflector lens 306 can be tuned to be repulsive to cause a surface collision when desired. The angled deflector lens 306, when a repulsive voltage is applied, pushes the ions upwards to hit the angled collision surface 302, which then results (when the energy is high enough) in surface-induced disassociation (SID). Collision causes a sudden deposition of energy into the ion, which can result in dissociation. With respect to the ion funnel 308, by applying DC and RF potentials to the lenses 310 in the ion funnel 308, ions that come off the surface after collision are better radially focused (as are ions that are sent straight through the device in a flythrough mode if no collision or dissociation is desired); this increase in collection efficiency helps prevent loss of signal and/or other valuable information for analyzing samples.

In some embodiments, DC potential is applied through the first and last lenses 310 of the ion funnel (e.g., leftmost lens and rightmost lens, respectively, as depicted in the lens stack shown in FIGS. 3 and 4). Now also referring to FIG. 5, in some embodiments a resistor network 502 between the lenses allows a DC gradient to be formed across the lens stack with only two potentials being applied. The overall DC potential goes "downhill", meaning that it becomes more attractive to the ions being analyzed, progressively along the length of the ion funnel 308 (e.g., more negative progressively through the device for positive ions and vice versa for negative ions). In some embodiments, the RF on adjacent electrodes is applied 180 degrees out of phase (one of the waveforms is at the peak of its cycle while the adjacent lenses have the RF at the minimal of its cycle).

In some embodiments, the RF is applied to the lenses through capacitors, for example the capacitors 506 shown in FIG. 5, which prevent the DC potential from adjacent lenses from being shorted together. In different embodiments, different RF waveforms may be applied to the ion funnel by the RF source 508. In some embodiments, sinusoidal RF is applied for the ion funnel. In other embodiments, square wave RF can be used. The DC gradient across the ion funnel and the RF amplitude and frequency being applied varies according to, for example, the analyte of interest and the gas flows around the device. In some embodiments, the frequency can be from 400 kHz to 975 kHz and the amplitude can be up to 150 Vpp. In other embodiments, the amplitude can be 1 kVpp or more, and the frequency can be up to 3 MHz. In some embodiments, DC gradients can range from, for example, 5 V across the funnel to up to 45 V across the funnel. It should be appreciated, however, that these respective values and ranges, including also the example capacitances and voltages shown in FIG. 5, may differ depending on the desired implementation. For example, the capacitors 508 shown in the embodiment of FIG. 5 may be 1 nF capacitors or otherwise, depending on the desired implementation.

In the embodiment shown in FIGS. 3 and 4, the ion funnel 308 has an inner diameter of 7.5 mm at its larger-diameter end (sometimes referred to herein as an "ion funnel entrance") and an inner diameter of 3 mm at its smaller-diameter end (sometimes referred to herein as an "ion funnel exit"), in 0.5 mm incremental steps across the respective lenses 310. It should be appreciated, however, that these respective diameters and incremental steps may have different values, depending on the desired implementation. For example, in some embodiments, the ion funnel 308 can have an inner diameter at its larger-diameter end of, for example, from 5 mm to 10 mm and an inner diameter at its smaller-diameter end of, for example, from 2 mm to 5 mm, and can have incremental steps across the respective lenses 310 of, for example, 0.5 mm to 1.0 mm. It should be appreciated that values of the respective diameters across the respective lenses 310 in some embodiments are not consistently changed according to preset steps; rather, the respective diameter(s) of one or more of the lenses may, for example, have the same respective diameter as one or more adjacent lenses 310.

The sizes of the larger-diameter end and smaller-diameter end, as well as the size of steps throughout the funnel may be adapted for use within various different instruments such as within larger mass spectrometry instruments and desired implementations.

Advantages in ease of use (in tunability, for instance, as discussed above) of certain embodiments of the present disclosure as compared to conventional approaches are provided due to, for example, certain configurations of the front end of the device (entrance-1, entrance-2, angled deflector lens, and angled surface) combined with the ion funnel. Through certain such configurations, the device can be made easier to tune; for example, in order to go between a setting for no surface collision (flythrough), and surface collision/dissociation (SID), the collision surface can be made more attractive and the angled deflector lens made more repulsive to guide ions to the surface. The ion funnel (e.g., with two applied potentials applied to the front and back of the funnel) helps to guide ions post-collision or in flythrough mode moving through one end of the device to the other. In some embodiments, voltages on the SID device are applied via an external power supply. The voltages in the external supply can be controlled using a separate software on a respective instrument computer; accordingly, in such embodiments, in order to run the SID device, instrument software can run the rest of the mass spectrometer in addition to controlling/applying the appropriate voltages via the external power supply software. Thus, in some embodiments, changes in tuning can be made via the software. Additionally, in some embodiments, the voltages on the SID device may be applied via an internal (part of the instrument) power supply. In this embodiment, the voltages may also be controlled via the instrument control software.

In order to tune a device in accordance with some embodiments, for flythrough mode, a user may look at the potentials being applied on either end of the SID device. For example, the lens immediately preceding the SID device may read back at −38 V and the lens immediately following the SID device may read back at −79 V; as such, the device is tuned so that there is an overall "downhill" (i.e., attractive to the ions from front-end to back-end of the device) potential that fits in line with the surrounding voltages. An example of "flythrough" tuning for these surrounding potentials is as follows: Entrance-1=−43 V; Entrance-2=−48 V; Angled deflector lens=−50 V; Collision surface=−52 V; Ion funnel entrance=−55 V; and Ion funnel exit=−75 V.

It should be noted that in accordance with some embodiments, the voltages applied to the ion funnel entrance and exit are affected by resistors across the length of the ion funnel.

In order to tune a device in SID mode in accordance with some embodiments, the ions are accelerated within the instrument pre-SID device. Then, the collision surface is tuned to be more attractive (negative for positive ions) and the angled deflector lens is tuned to be more repulsive to push ions up toward the collision surface (i.e., more positive for positive ions). An example of a low SID energy tuning is as follows: Entrance-1=−80 V; Entrance-2=−115 V; Angled deflector lens=−65 V; Collision surface=−95 V; Ion funnel entrance=−95 V; Ion funnel exit=−130 V.

In one embodiment, a surface-induced dissociation (SID) device with an ion funnel 308 is comprised of 16 lenses 310 and a collision surface 306, and there are six DC potentials applied to the device. In some embodiments, to move from flythrough mode to SID mode, if the larger mass spectrometry instrument in which the device is disposed is being operated in "TOF mode", which involves less background gas, then only two applied potentials may need to be changed. According to other embodiments, if the mass spectrometry instrument incorporating the device is in "mobility" mode, the ion funnel is retuned (which may involve tuning six voltages) to give a larger overall gradient, in order to give the ions more of a push (i.e., enough kinetic energy) to get through because of the additional background gas. As discussed above, a main contributor to the tuning difficulties experienced in conventional devices relates to the large number of independent lenses that must be tuned.

As discussed above in some detail, implementations of various aspects of the present disclosure, in accordance with various embodiments, offers numerous advantages over conventional configurations. For example, an SID device 300 according to some embodiments of the present disclosure uses fewer independently-tuned lenses 310, meaning fewer DC voltages 510 (and thus fewer power supplies) needed for operation. Additionally, devices according to some embodiments offer simplicity in tuning compared with conventional devices, allowing for increased end-product usability in the hands of a non-expert. In certain example implementations of device(s) according to the present disclosure, experimental efficiency of ion recovery after surface collision was estimated at 30%, by comparing signal at a detector for flythrough and SID. The angle of the collision surface in various embodiments of the present disclosure may allow for greater conversion of kinetic energy into internal energy compared to conventional devices at a given collision voltage, leading to more efficient dissociation; this can be very valuable, as difficult-to-dissociate samples such as antibodies can be realized as new implementations for SID. Antibodies are often difficult to fully dissociate with current SID devices and benefit from a higher energy collision process.

In accordance with certain implementations of devices in accordance with various embodiments of the present disclosure, ion product recovery was higher than in conventional devices in the high mass range (4000-8000 m/z), offering better sensitivity, which is advantageous when working with samples that have limited ion abundance. While some example implementations described above relate to protein complexes, SID device(s) in accordance with various aspects and embodiments disclosed herein may also be used for small molecules by, for example, lowering the RF amplitude applied in the ion funnel lenses. As one example, SID according to one or more embodiments disclosed herein can be used in fragmenting lipids; SID can provide more extensive fragmentation of a lipid head group as compared to other techniques such as CID.

Figure 6:
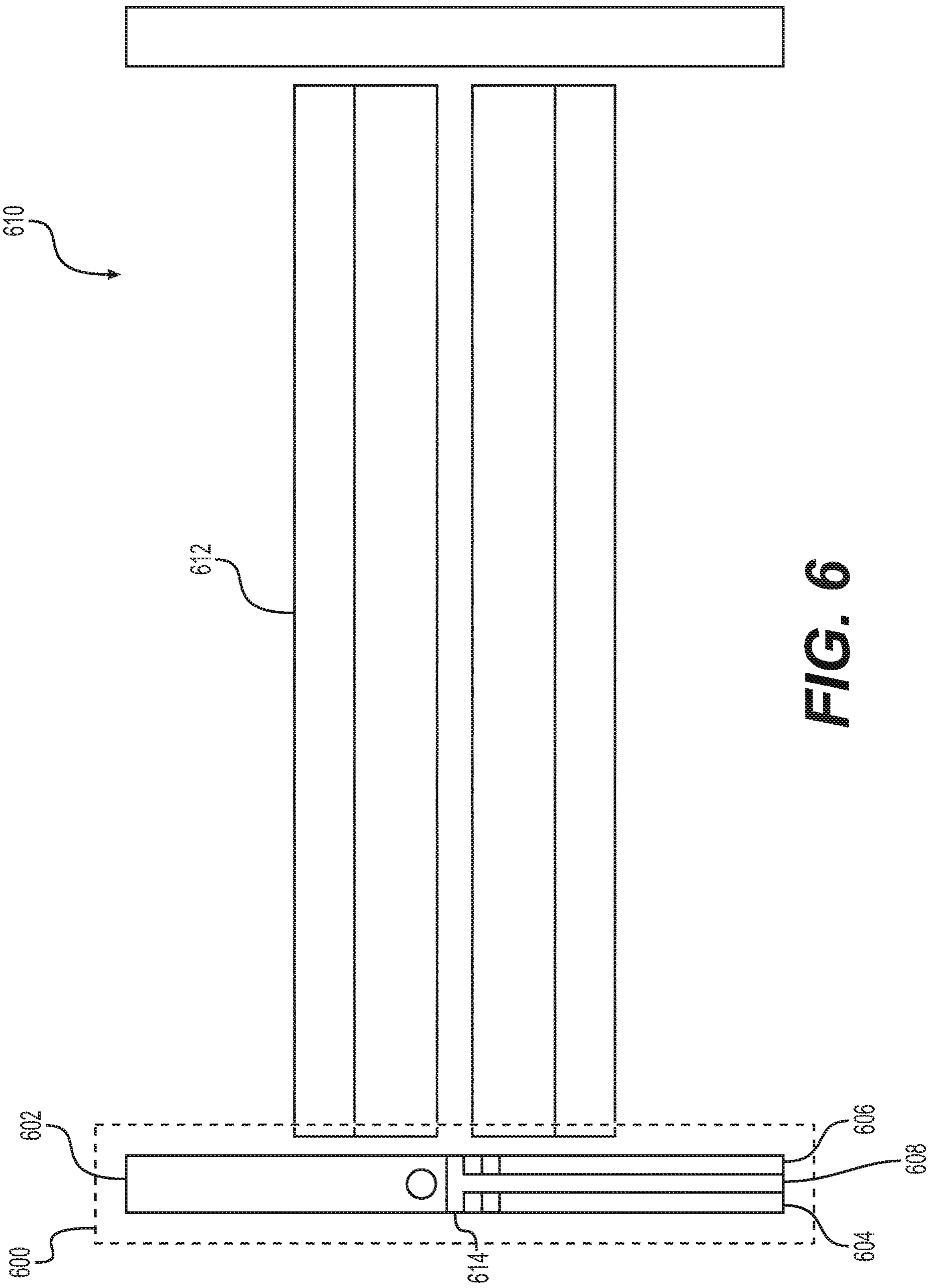
FIG. 6 illustrates a configuration of a split lens SID device according to some embodiments of the present disclosure, used with a collision cell.
Figure 7:
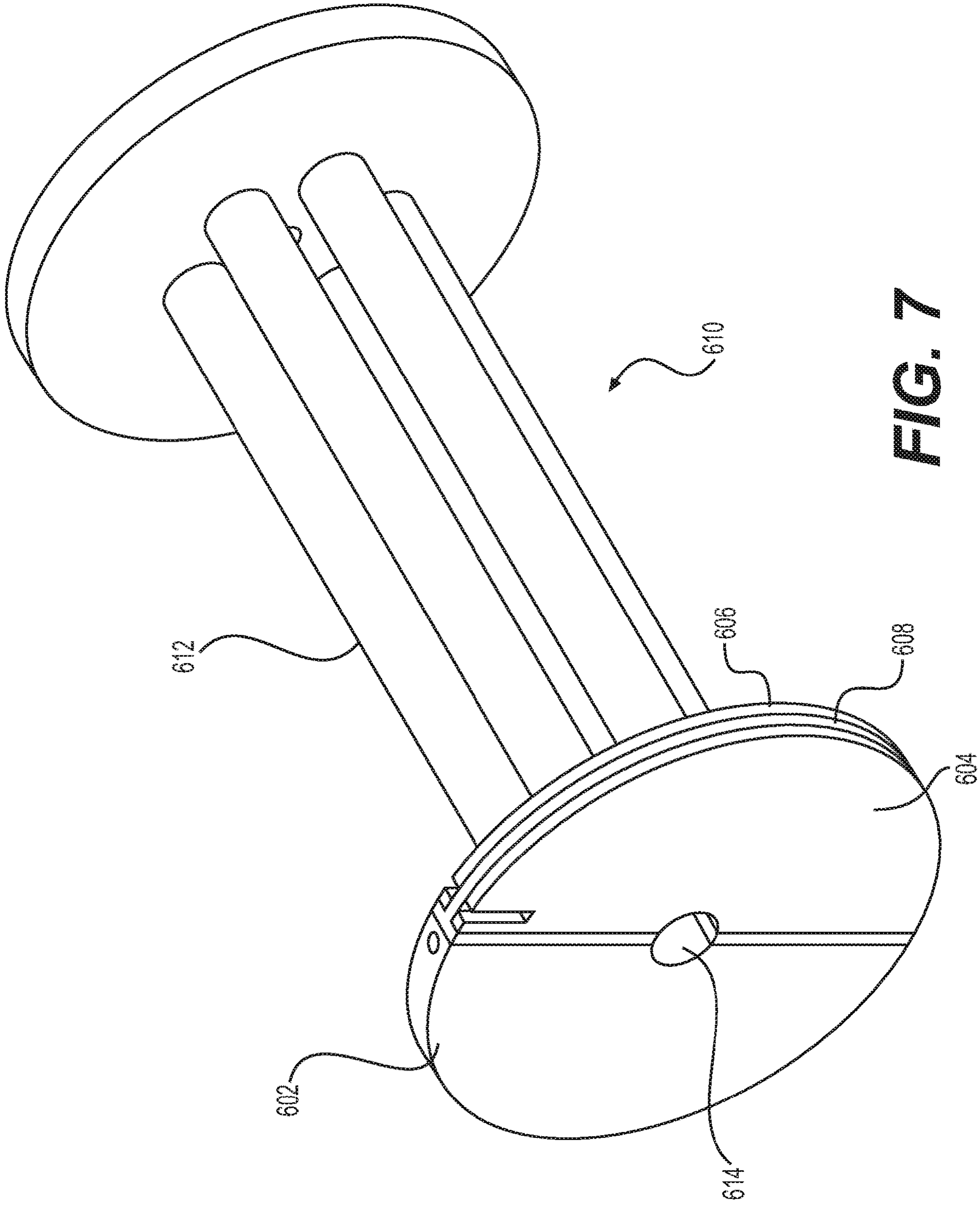
FIG. 7 illustrates a perspective view of a split lens SID device according to some embodiments of the present disclosure, used with a collision cell.

Now referring to FIGS. 6 and 7, some embodiments of the present disclosure have a split lens design. In an embodiment shown in FIGS. 6 and 7, a split lens 600 forms an endcap of a collision cell 610. The surface 602 may form part of the collision cell endcap. Precursor ions flow through the entrance 614. The deflector 604 directs precursor ions toward the surface 602. The extractor 606 guides product ions and unfragmented precursor ions out of the split lens 600 and into the collision cell 610. The collision cell 610 is comprised of collision cell rods 612. A spacer 608 separates the extractor 606 from the deflector 604. In some embodiments the spacer 608 is made from a nonconductive material such as polyetheretherketone (PEEK) or a ceramic.

One surface-induced dissociation device design (installed in a Waters/Micromass QTOF II and subsequently in WATERS SYNAPT G2 and G2S) (1) consisted of 10 independent DC electrodes to divert an incoming ion beam (from a quadrupole mass filter) into a conductive surface and extract and focus it after surface collision. Subsequent designs installed in 15 T Fourier Transform Ion Cyclotron Resonance (FT-ICR) and Thermo Scientific EMR/UHMR ORBITRAPs consisted of 10 and 12 independent DC electrodes, respectively. In the SYNAPTs, the 'trap' stacked ring ion guide (SRIG) prior to the ion mobility cell is truncated by ~3 cm to make room for the SID device, whereas in the ORBITRAP the SID device entirely replaces the transfer multipole prior to the C-trap. Here the comparison of designs within the ICR is focused on.

In some embodiments of the present disclosure, the collision cell 610 is a commercially available collision cell 610. For example, a Bruker collision cell 610 may be used. In some ICR SID implementations the collision cell 610—which collects ions after transfer through the quadrupole mass filter—is truncated to make room for SID electrodes. Some embodiments implementing a TSCC cut the SID region to 14 mm while reducing the number of DC electrodes from 10 to 6, and thus the collision cell was lengthened to 48 mm compared to some embodiments implementing a 10-lens design (16) in order to improve sensitivity. Simultaneously, the mass range of the device was increased from m/z 7,000 to m/z 22,000 by decreasing the inscribed radius of the collision cell rods 612 and replacing the rectilinear trap design with a hexapole.

Figure 8C:
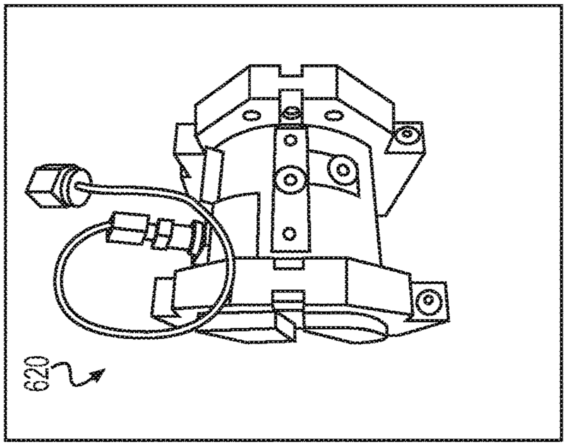
FIGS. 8A-8D illustrate embodiments of split lens SID devices according to certain embodiments of the present disclosure.
Figure 8B:
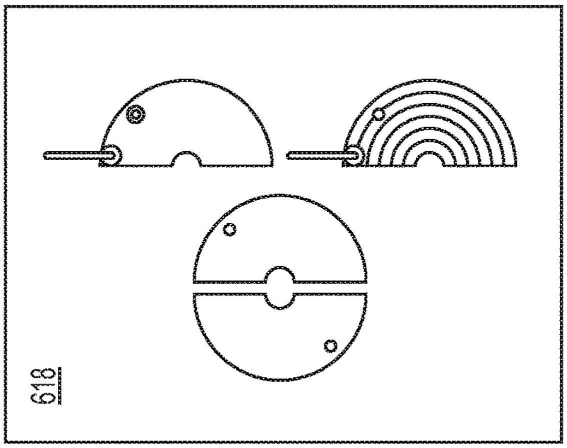
Figure 8A:
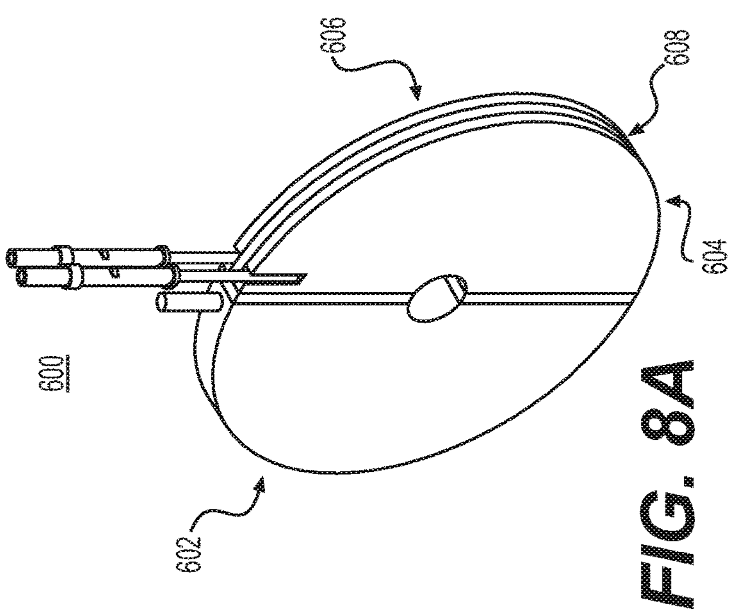

Some embodiments implementing a split lens have a lengthened collision cell. This may result in improved trap capacity, can simplify SID tuning and improve the collection efficiency of protein complexes after surface collision. FIG. 8A shows an implementation of a split lens according to one embodiment, which includes three electrodes (surface 602, deflector 604, and extractor 606) and a single nonconductive spacer 608. In some embodiments the nonconductive spacer is PEEK or ceramic. The device replaces the original front endcap 600 of the collision cell 610, but the remaining portion of the collision cell 610 remains untouched. Devices implementing a split lens design can thus: function as the front endcap 600 of the collision cell 610 as ions are accumulated and eventually pulsed to the ICR cell for mass analysis; and, perform surface-induced dissociation if desired. As shown in FIGS. 8B and 8C, the entire SID device can be 3.25 mm in length or less.

In flythrough and CID modes, balanced voltages of either 3.4 V (positive mode) or −3.4 V (negative mode) are applied to all three electrodes in order to gate ions into the collision cell 610 during accumulation. In one example implementation, the 'surface' voltage is provided by the original Bruker front endcap voltage and the other two voltages are supplied by an external 10-channel Ardara DC power supply. After accumulation, the voltages on the collision cell rods 612 and the endcaps are pulsed in order to transmit ions to the ICR cell. Because the deflector 604 and extractor 606 voltages are provided externally, they are constant and only the surface 602 voltage is varied. In spite of this, the device functions properly in transmission and CID modes. That is, ions are successfully extracted from the collision cell even though only half of the front endcap is pulsed.

During SID mode (for positive ions), an attractive negative voltage approximately equal to the total voltage drop the ion experiences in the instrument is applied to the 'surface' half of the front endcap 600 while a positive deflection voltage is applied to the front half of the other side of the endcap in order to push the ions into the surface. The extractor 606 is held at a negative voltage in order to extract ions off the surface 602 and into the collision cell 610. The collision cell 610 is held at a more negative bias than the surface 602 so that the ions do not escape out the front endcap. After ion accumulation, the surface half of the front endcap 600 is pulsed to ~30 V in order to extract ions toward the ICR cell.

Figure 8D:
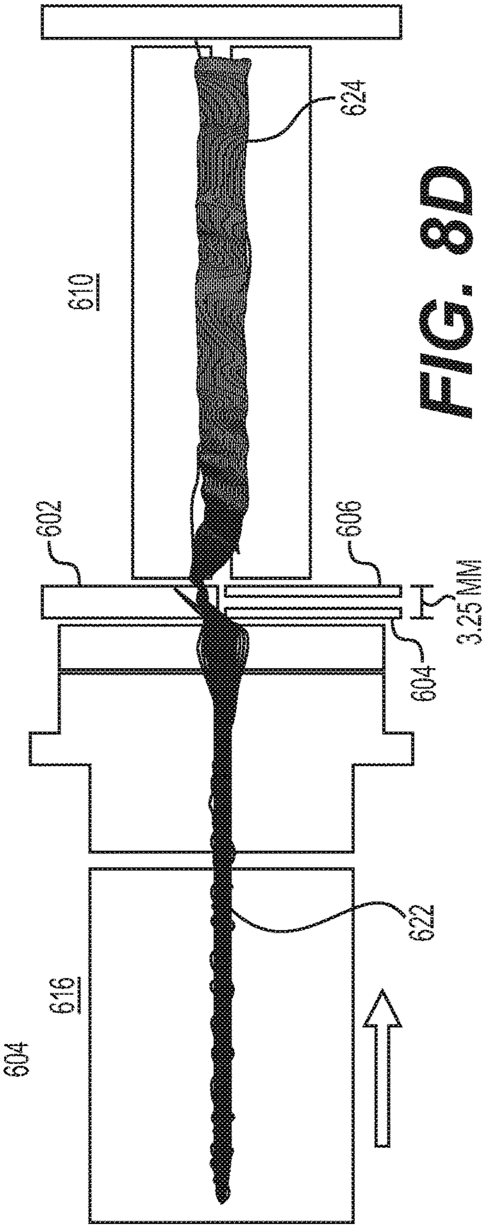

Initial simulations were carried out in SIMION 8.1 (Scientific Instrument Services, Ringoes, NJ, USA) and consisted of the quadrupole mass filter (with pre- and post-filters), two focusing lenses after the post-filter, and the SID/CID device. The initial conditions of the ions were as follows: number of ions, 1,000; ion mass, 53.22 kDa; ion charge, 10+; source position, Gaussian distribution with 0.2 mm standard deviation in the radial dimension; initial ion kinetic energy, Gaussian distribution with 25+/−5 (FWHM) eV; time-of-birth, uniform distribution between 0 and 5 microseconds. The quadrupole was operated in RF-only mode (2,000 Vpp at 880 kHz) to transmit the ions to the surface where SID was simulated. To perform SID, the ion was stopped within ~0.2 mm of the surface and its kinetic energy was altered to retain ~5% of its kinetic energy prior to collision. The ion's trajectory was then reflected in a specular manner with respect to the surface normal. The simulated trajectory of the ions through the device is depicted in FIG. 8D. Precursor ions 622 flow through the device, becoming product ions 624 that enter the collision cell 610.

Figure 9A:
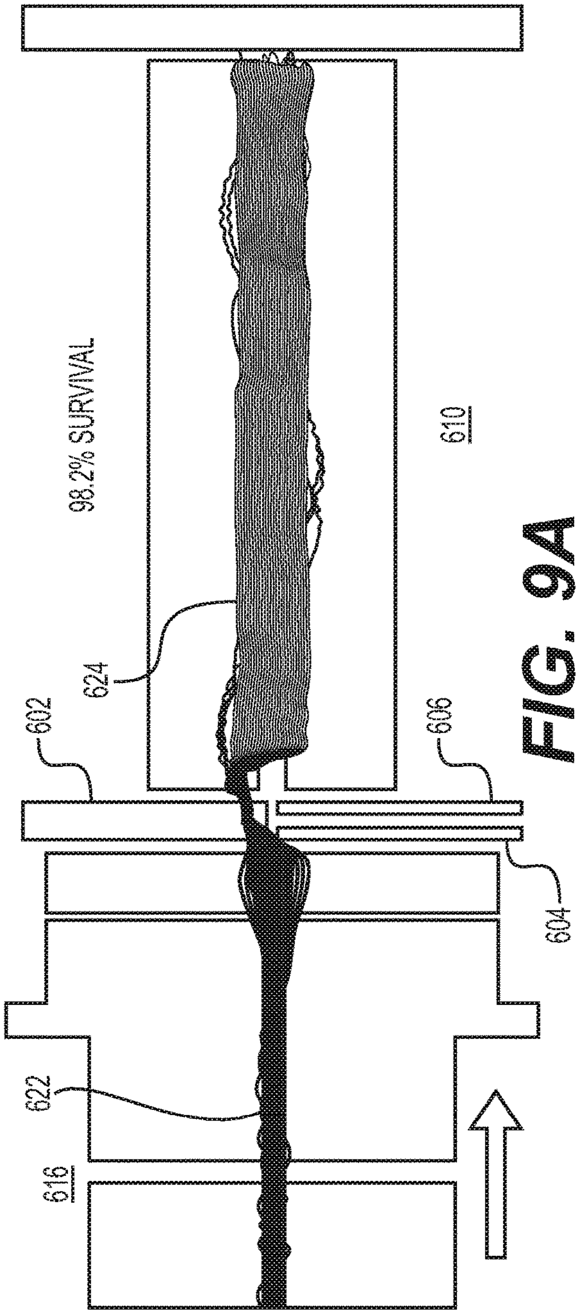
FIGS. 9A-9B illustrate SIMION 8.1 simulations of surface-induced dissociation (acceleration potential of 85 V).
Figure 9B:
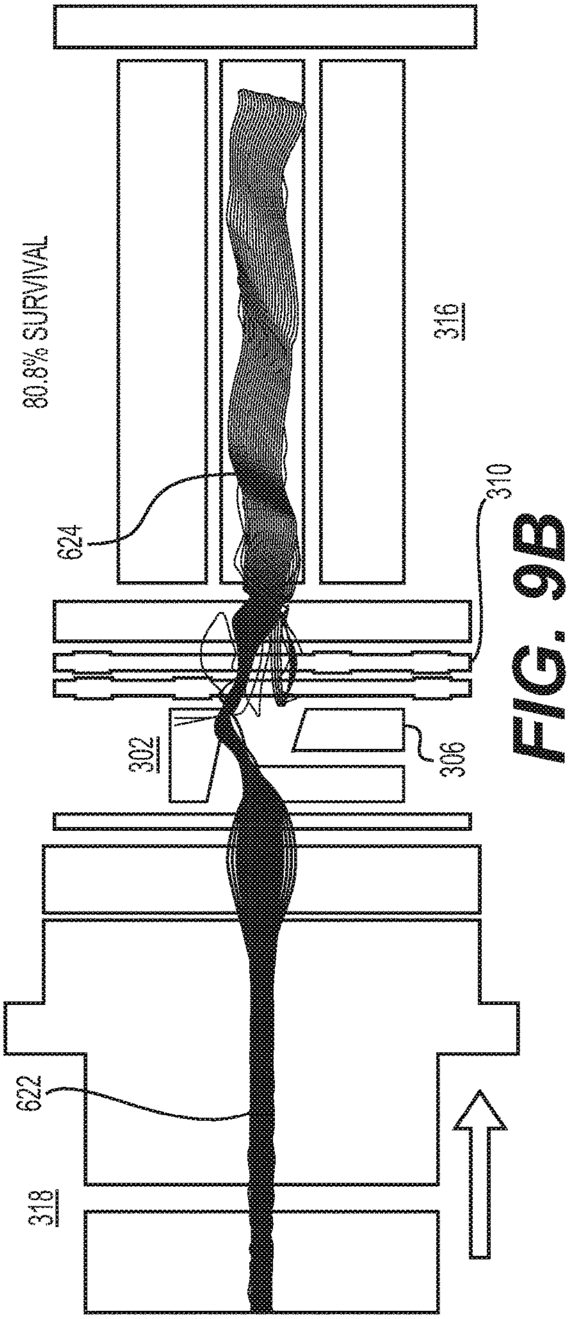

With reference to FIGS. 9 and 10, a 98.2% ion survival was observed with embodiments implementing a split lens compared to 80.8% survival in embodiments implementing a TSCC. "Ion survival" refers to the percentage of ions that successfully move all the way through the device from font to back, whereas an ion that does not successfully move all the way through does not "survive". Again, the flow of precursor ions 622 enters the device and the resulting flow of product ions enter the collision cell 610. Note that this result does not imply that nearly 100% of precursor ions are successfully converted to and detected as fragment ions. Rather, the implication is that relative to embodiments implementing a TSCC, embodiments implementing a split lens placed just prior to an RF trapping device can have higher performance in terms of ion survival. Less ideal conditions were then simulated, i.e. a larger ion beam, greater initial kinetic energy dispersion, greater variability in reflection angle, and variability in kinetic energy retention after surface collision. The results are collected in Table S1 below.

TABLE S1

| Conditions | Embodiment Implementing a Split Lens -- Survival | Embodiment Implementing a TSCC -- Survival |
|---|---|---|
| 'Ideal' Conditions | 98.2% | 80.8% |
| Reflection angle, specular +/−20° instead of +/−0° | 98.2% | 73.6% |
| Initial ion KE FWHM of 10 eV instead of 5 eV | 98.3% | 76.0% |
| Source position, Gaussian distribution with 0.4 mm standard deviation instead of 0.2 mm (i.e. larger ion beam) | 80.8% | 54.7% |
| Ion KE retention after surface collision, 5% +/− 2% instead of 5% +/− 0% | 95.8% | 39.3% |

Under the simulation conditions depicted in FIGS. 9 and 10, embodiments implementing a split lens returned superior results in some aspects, such as in comparative survival results, and in some circumstances may be more tolerant to heterogeneous ion beams than embodiments implementing a TSCC. For example, in the simulation depicted in FIGS. 9 and 10, increasing the range of possible reflection angles from specular +/−0° to specular +/−20° results in a drop in survival from 80.8% to 73.6% for embodiments implementing a TSCC, whereas virtually no difference is observed for embodiments implementing a split lens. Both devices are particularly sensitive to ion beam size, with survivals of 80.8% and 54.7% (split lens and TSCC embodiments, respectively) when the ion beam standard deviation in the radial dimension is doubled. Embodiments implementing a split lens may be more tolerant to kinetic energy retention after surface collision, with 95.8% survival compared to 39.3% survival for embodiments implementing a TSCC if the kinetic energy retention is a range of values (5%+/−2%) rather than a fixed value (5%).

In certain example implementations of a split lens SID device in accordance with some embodiments of the present disclosure, the ions are extracted directly into a trapping RF field. There are no intermediate electrodes (between surface and collision cell) on which ions can neutralize after they are reflected off the surface. This can be particularly important for ion beams that are large or diverse in terms of radial position and kinetic energy (i.e. large and highly charged ions). Some embodiments implementing a split lens according to the present disclosure use a cylindrical surface. When a converging or diverging ion beam hits a flat surface, in both cases the reflected ion beam diverges because variations in angle of approach translate directly into variations in reflection angle. For the cylindrical surface of some embodiments implementing a split lens, no matter where on the surface the ions hit, they are always focused towards the radial center of the collision cell.

Because the cross-sectional dimensions of the collision cell rods 612 and the inscribed radius ($r_0$) are the same in embodiments implementing a split lens and embodiments implementing a TSCC, no increase in mass range was observed. As such, only SID signal intensity—at a given accumulation time—is compared in the present discussion. The SID signal intensity was profiled using three different protein complexes, ranging from a 115 kDa pentamer (charge reduced c-reactive protein) to 230 kDa pyruvate kinase tetramer and 330 kDa glutamate dehydrogenase hexamer. The same nanospray tip was used to record full MS and SID intensities for both embodiments implementing an ion funnel and embodiments implementing a split lens, which was possible because venting the instrument, swapping devices, and pumping down required only ~15 minutes. For these comparisons the following acceleration voltages were used: c-reactive protein, 85 V; glutamate dehydrogenase and pyruvate kinase, 135 V. The quadrupole was purposely placed in rf-only mode (low mass of 1,000) for these experiments, as the quadrupole can stretch the ion beam in the radial dimension through application of a resolving DC voltage. Because the surfaces used in this work are of different geometries (TSCC embodiment, flat with 10° tilt; split lens embodiment, cylindrical with no tilt), selecting by the quadrupole in rf/dc mode could be more detrimental to one device. This additional variable could convolute the results; here, the performances of embodiments implementing a TSCC and embodiments implementing a split lens were compared without interference from other ion optics. The surfaces in both generations of devices were stainless steel for this experiment.

Figure 14:
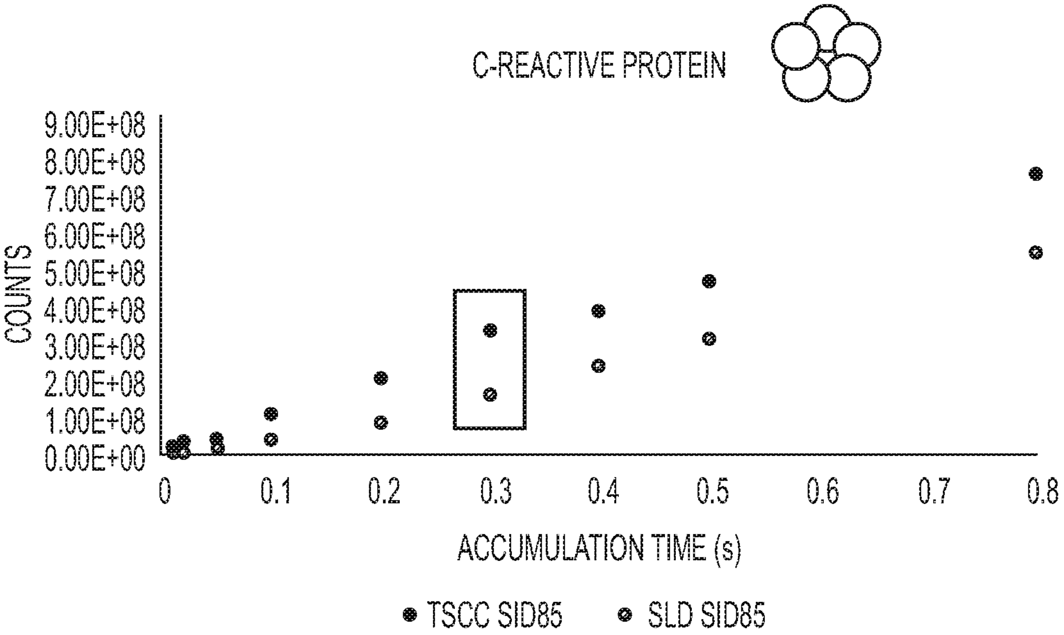
FIG. 14 illustrates a comparison of the SID sensitivity of embodiments implementing a split lens device (SLD) and embodiments implementing a tilted surface with collision cell (TSCC) as a function of accumulation time for charge reduced C-reactive protein (SID 85 V). The average charge state (number of elementary charges on the analyte) of the precursors was +18.
Figure 15:
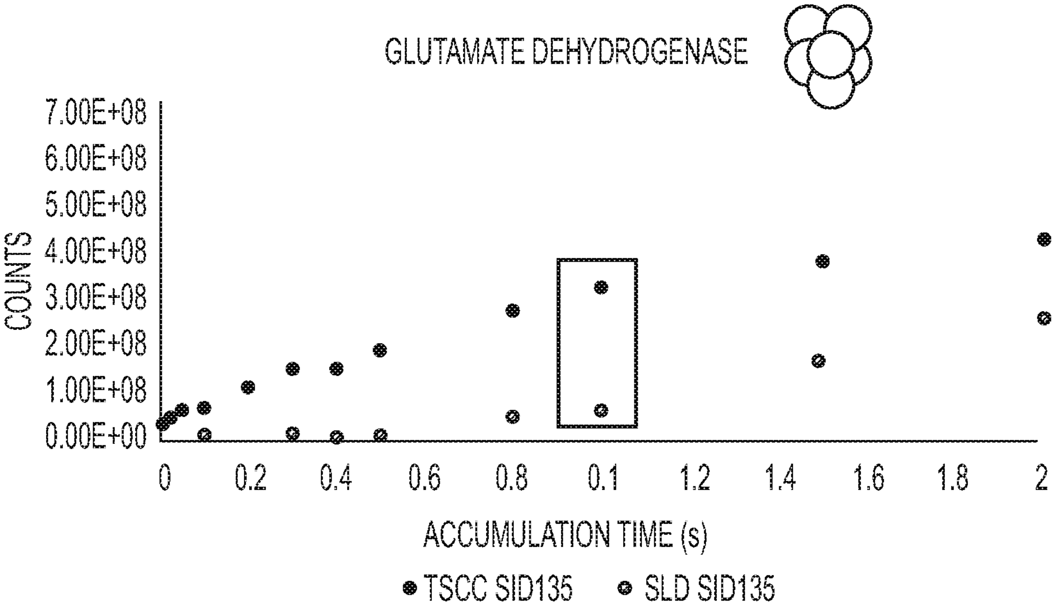
FIG. 15 illustrates a comparison of the SID sensitivity of embodiments implementing a split lens device (SLD) and embodiments implementing a tilted surface with collision cell (TSCC) as a function of accumulation time for glutamate dehydrogenase (SID 135 V). The average charge state of the precursors was +40.
Figure 16:
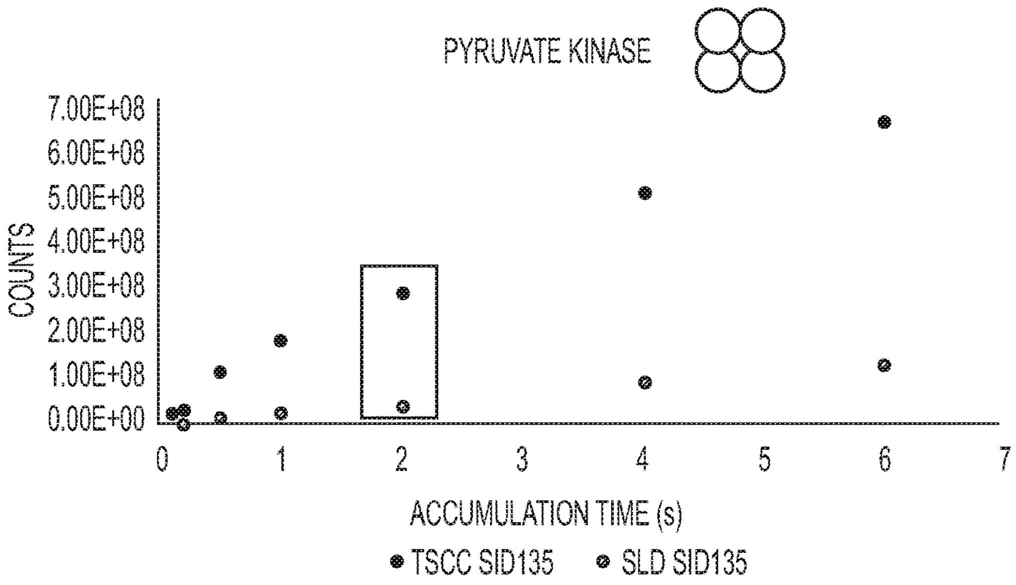
FIG. 16 illustrates a comparison of the SID sensitivity of embodiments implementing a split lens device (SLD) and embodiments implementing a tilted surface with collision cell (TSCC) as a function of accumulation time for pyruvate kinase (SID 135 V, spectrum smoothed using a 2 Da wide Gaussian filter). No isolation was performed in this experiment. The average charge state of the precursors was +35.
Figure 17:
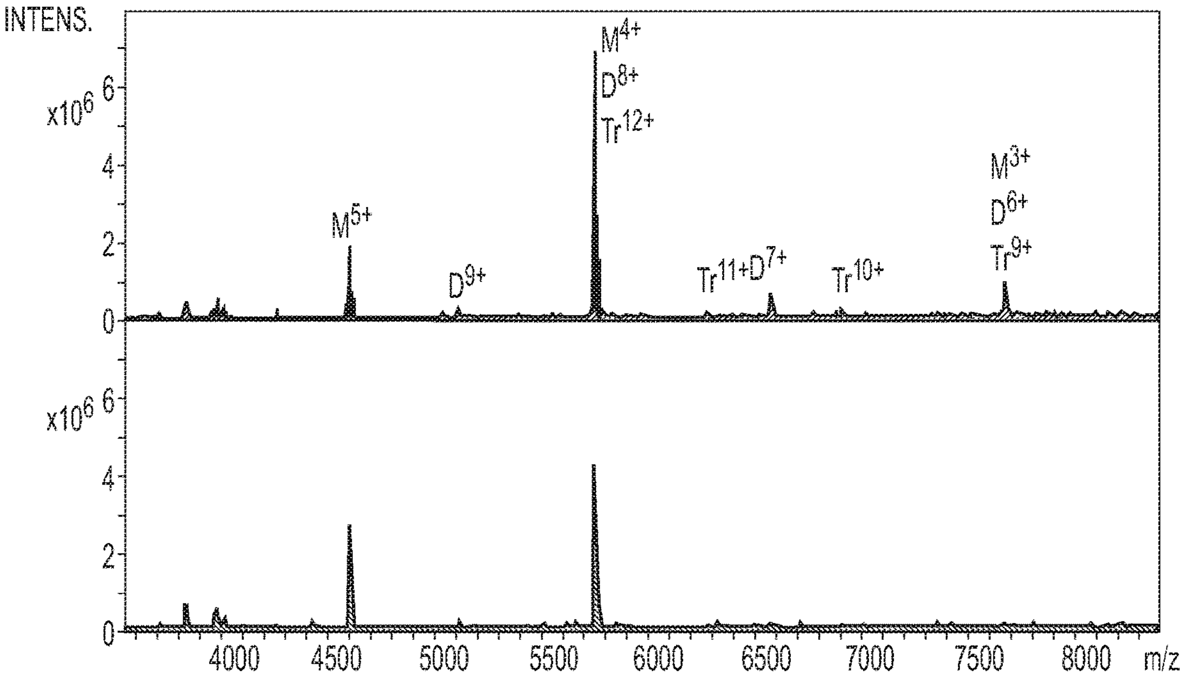
FIG. 17 illustrates the corresponding spectra for the data points highlighted by the black box in FIG. 14. M=monomer, D=dimer, T=trimer.
Figure 18:
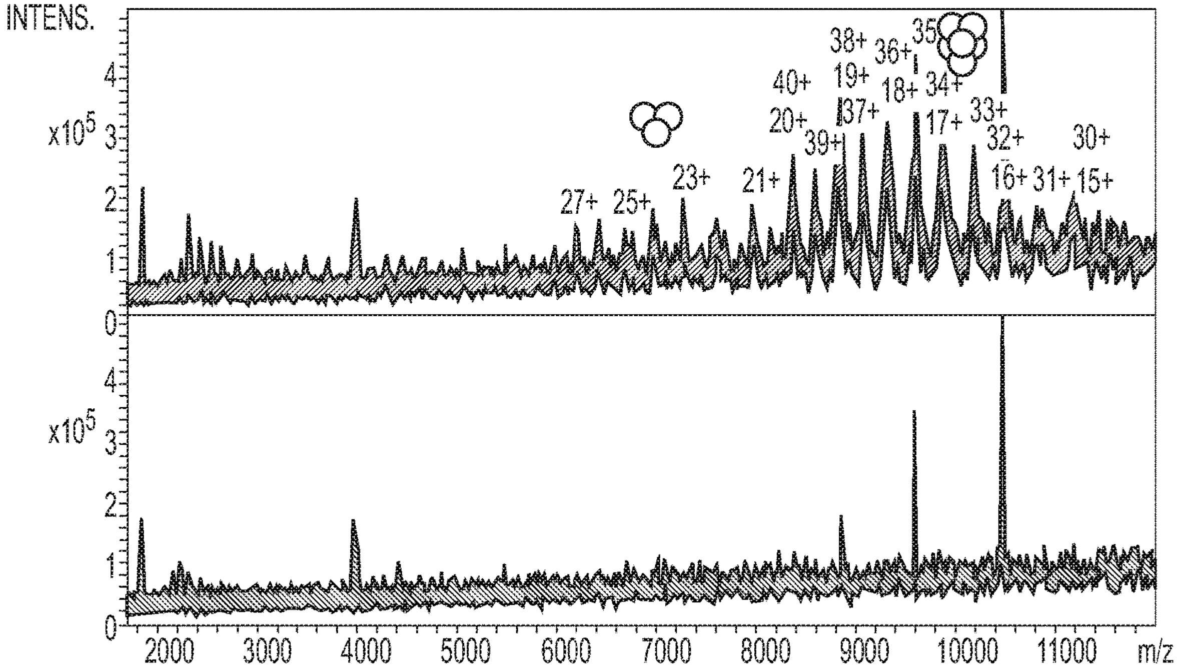
FIG. 18 illustrates the corresponding spectra for the data points surrounded by a black box in FIG. 15. M=monomer, D=dimer, T=trimer.
Figure 19:
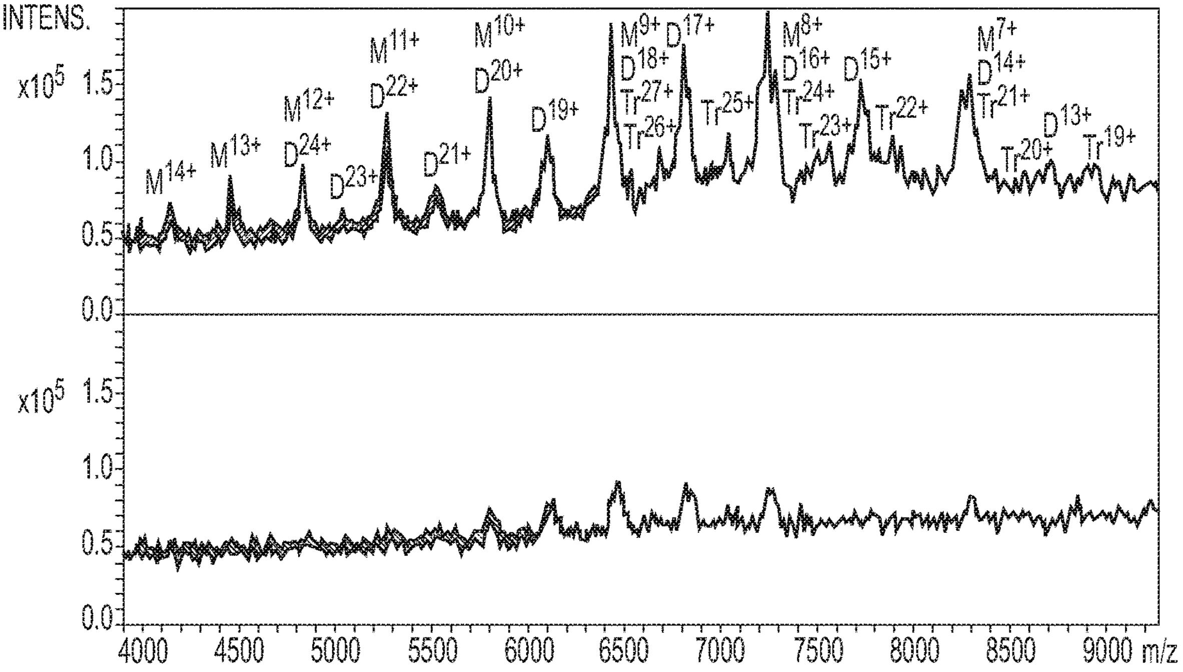
FIG. 19 illustrates the corresponding spectra for the data points surrounded by a black box in FIG. 16. M=monomer, D=dimer, T=trimer.

FIGS. 14-19 illustrate a comparison of the SID sensitivity of embodiments implementing a split lens and embodiments implementing a TSCC as a function of accumulation time for different substances. No isolation was performed in the experiments which produced the results depicted in FIGS. 14-19. "M" corresponds to monomers, "D" to dimers, and "T" to trimers. FIG. 14 shows the results for charge reduced C-reactive protein (SID 85 V). FIG. 14 shows the result when the average charge state of the precursors was +18. FIG. 17 shows the corresponding spectra for the data points surrounded by a black box in FIG. 14. Similarly, FIG. 15 shows results for glutamate dehydrogenase (SID 135 V). The average charge state of the precursors was +40. The corresponding spectra for the data points surrounded by a black box in FIG. 15 are shown in FIG. 18. Finally, FIG. 16 illustrates a comparison of the SID sensitivity of embodiments implementing a split lens and embodiments implementing a TSCC as a function of accumulation time for pyruvate kinase (SID 135 V, spectrum smoothed using a 2 Da wide Gaussian filter). The average charge state of the precursors was +35. The corresponding spectra for the data points surrounded by a black box in FIG. 16 is depicted in FIG. 19. These results indicate that some embodiments of the split lens and TSCC generate similar results fragment ions with different intensities.

FIGS. 14-15 show a comparison of absolute signal intensities for surface-induced dissociation of C-reactive protein pentamer, and glutamate dehydrogenase hexamer. FIG. 19 shows a comparison of absolute signal intensities for surface-induced dissociation of pyruvate kinase tetramer on both a TSCC device and a split lens device (SLD). The tested embodiment of the split lens device achieves higher signal intensity per accumulation time. FIGS. 17-19 show spectra that correspond to the accumulation times highlighted by the black boxes. For c-reactive protein, approximately double the ion intensity was observed at 0.3 s accumulation time. For glutamate dehydrogenase and pyruvate kinase, the intensity was nearly 5× higher for the split lens embodiment tested in both cases (at 1 s and 2 s accumulation times, respectively), which is highly evident from the spectral comparisons depicted in FIGS. 18 and 19. Importantly, the higher intensities observed on the tested split lens embodiment are not due to a brighter ion beam. If the SID intensity is expressed as a ratio of the measured full scan intensity, the same qualitative results are observed in tests with C-reactive Protein, Glutamate Dehydrogenase, and Pyruvate Kinase. Note that at high accumulation time the ratio can exceed 100% because the collision cell saturates in full MS mode but continues to fill in SID mode. The improved sensitivity is higher for the larger two protein complexes, an observation that agrees with simulated results. In short, the split lens design is more tolerant to ion beam dispersion in position, angle, and kinetic energy, which is most prominent for large and highly charged ions like pyruvate kinase and glutamate dehydrogenase.

The 15 T FT-ICR can provide resolution that exceeds that of other mass analyzers. While the transient length of the ORBITRAP can be increased, ion losses are particularly evident for large protein complexes and their subunits, leading to spectral biases previously observed in SID spectra. (3) In other words, for overlapping oligomers, either ion mobility or high-resolution FT-ICR measurements are needed. Ring-shaped protein complexes were chosen to demonstrate the utility of ultrahigh resolution, as these tend to dissociate into all possible oligomeric states. Because symmetric charge partitioning is observed for SID, the oligomeric states tend to overlap.

HFQ65 is a ring-shaped 43 kDa hexameric RNA chaperone that is a truncated form of HFQ102. (5, 6). The full scan of the charge-reduced precursor shows 8+ through 12+ hexamer as prominent native species. Because the complex takes the form of a ring, the surface-induced dissociation spectrum of the isolated 11+ precursor yields monomer through unfragmented hexamer, any many peaks are combinations which require either ion mobility or high resolution to confirm. The peak at m/z 3594, for example, clearly consists of monomer 2+, dimer 4+, and trimer 6+, all of which are easily resolved with an 8*s* transient. Although no precursor charge state was isolated in this experiment, the ICR is capable of resolving unfragmented precursor from SID products, as shown in the peak at m/z 4791. Dimer 3+, tetramer 6+, and unfragmented hexamer 9+ are all evident and baseline resolved in this spectrum.

HFQ102 is similarly a hexameric protein complex but has molecular 'tails' on each subunit, which are not found on HFQ65. Data were collected, including the full scan and SID spectrum of the charge-reduced complex, with hexamer 10+ through 13+ observed as precursors. The HFQ102 peaks were broader than HFQ65 in part due to salt retention in the monomer tails. The peak at m/z 3679 consists only of monomer and dimer, evident in the expanded peak view, whereas m/z 5518 consists of several species, monomer 2+, dimer 4+, trimer 6+, and tetramer 8+. While monomer through trimer are baseline resolved from each other, there is overlap once a fourth species is added to the mix, particularly as the ICR's resolution decreases at higher m/z values.

Trp RNA binding attenuation protein (TRAP) is a 91 kDa homo-11mer that participates in allosteric gene regulation. (7). The mass spectrum of the apo TRAP protein complex in 200 mM EDDA (charge reducing agent) indicates primary charge states of 16+ through 20+. As expected, the collision-induced dissociation shows asymmetrically charged monomers and decamers. On average, the monomers take approximately ⅓ of the charge despite making up only 1/11 of the mass of the total complex. Surface-induced dissociation gives symmetrically charged products ranging from monomer through decamer, though most of the ion intensity is monomer through hexamer. Experimental data was collected including various peaks. For example, m/z 4121 consists of monomer 2+, dimer 4+, trimer 6+, and a small amount of tetramer 8+ and pentamer 10+. The peak at m/z 5495 can consist of dimer 3+, tetramer 6+, hexamer 9+, octamer 12+, and decamer 15+. The higher charge states and higher m %-z value cause a significant amount of overlap, though dimer, tetramer, and hexamer are well resolved. Lastly, m/z 8241 consists of monomer through pentamer of low charge states. Increasing the transient length to 8M increased the resolution somewhat (not shown), but also decreased the signal-to-noise of higher order oligomers due to the increased path length.

In devices according to certain embodiments disclosed herein, a split endcap geometry is compatible with surface-induced dissociation, collision-induced dissociation, and ion accumulation in the same volume. Some embodiments implementing a split lens design do not require any additional room in the instrument. Therefore some embodiments implementing the split lens design may be small enough replace the original collision cell endcap. Additionally, some embodiments implementing a split lens may exhibit increased sensitivity, especially for large protein complexes.

Certain embodiments are also effective in combination with the high resolution of the 15 T FT-ICR for analyzing hexameric HFQ RNA chaperones and 11mer trp RNA binding attenuation protein (TRAP), both of which are ring structured protein complexes that, by SID, produce oligomers that overlap in m/z space.

Figure 10A:
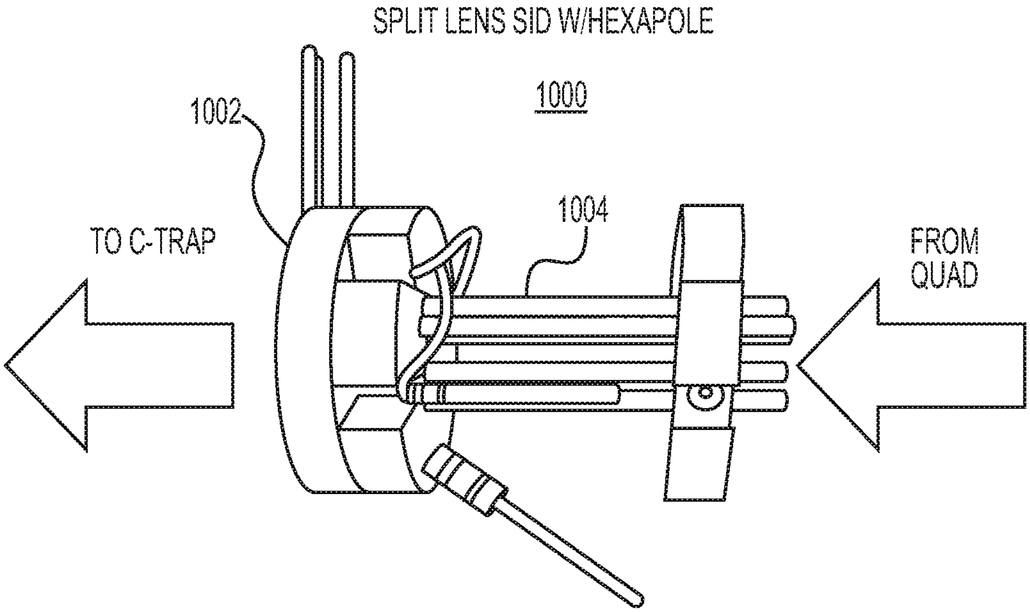
FIG. 10A illustrates a split lens SID with a hexapole.
Figure 10B:
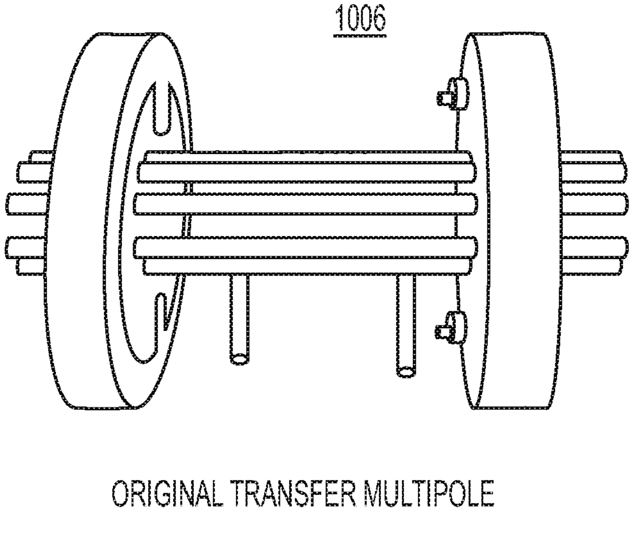
FIG. 10B illustrates, in comparison, an original transfer multipole design.

FIG. 10A illustrates a split lens SID device with a hexapole 1000, according to an embodiment of the present disclosure. In comparison, FIG. 10B illustrates an existing transfer multipole device 1006. The split lens 1002 shown in FIG. 10A is placed after a custom-made transfer hexapole 1004 and prior to the C-trap. Ions are transported from a quadrupole mass filter (1108 in FIG. 11) through the hexapole and either through the split lens ('flythrough' mode) or made to collide with the surface electrode of the split lens to induce dissociation, and subsequently the fragment ions and unfragmented precursor ions are collected in or transmitted through the C-trap (1110).

Figure 11:
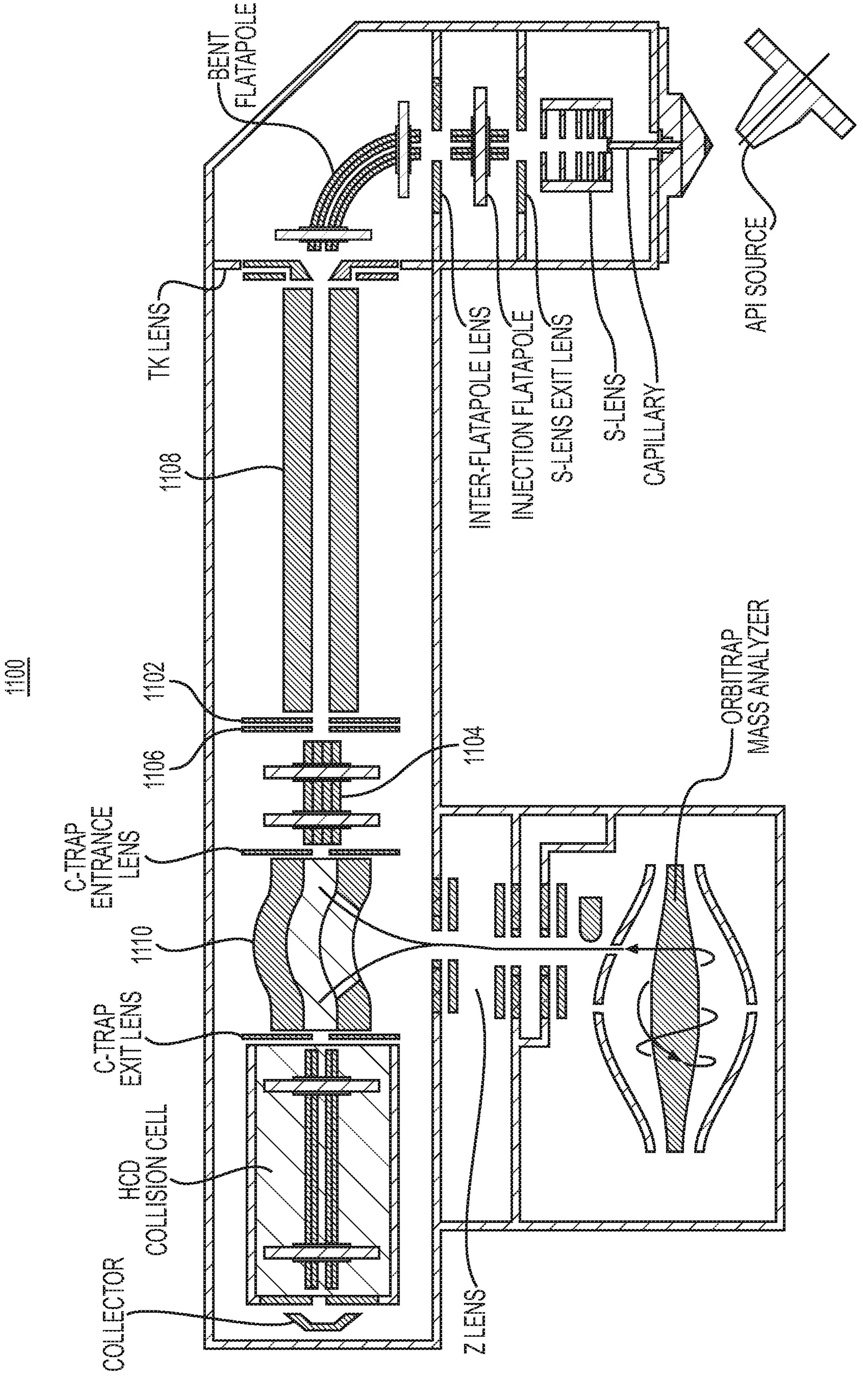
FIG. 11 shows a schematic diagram of an extended mass range ORBITRAP. The split lens device according to an embodiment of the present disclosure replaces the original transfer multipole.
Figure 12:
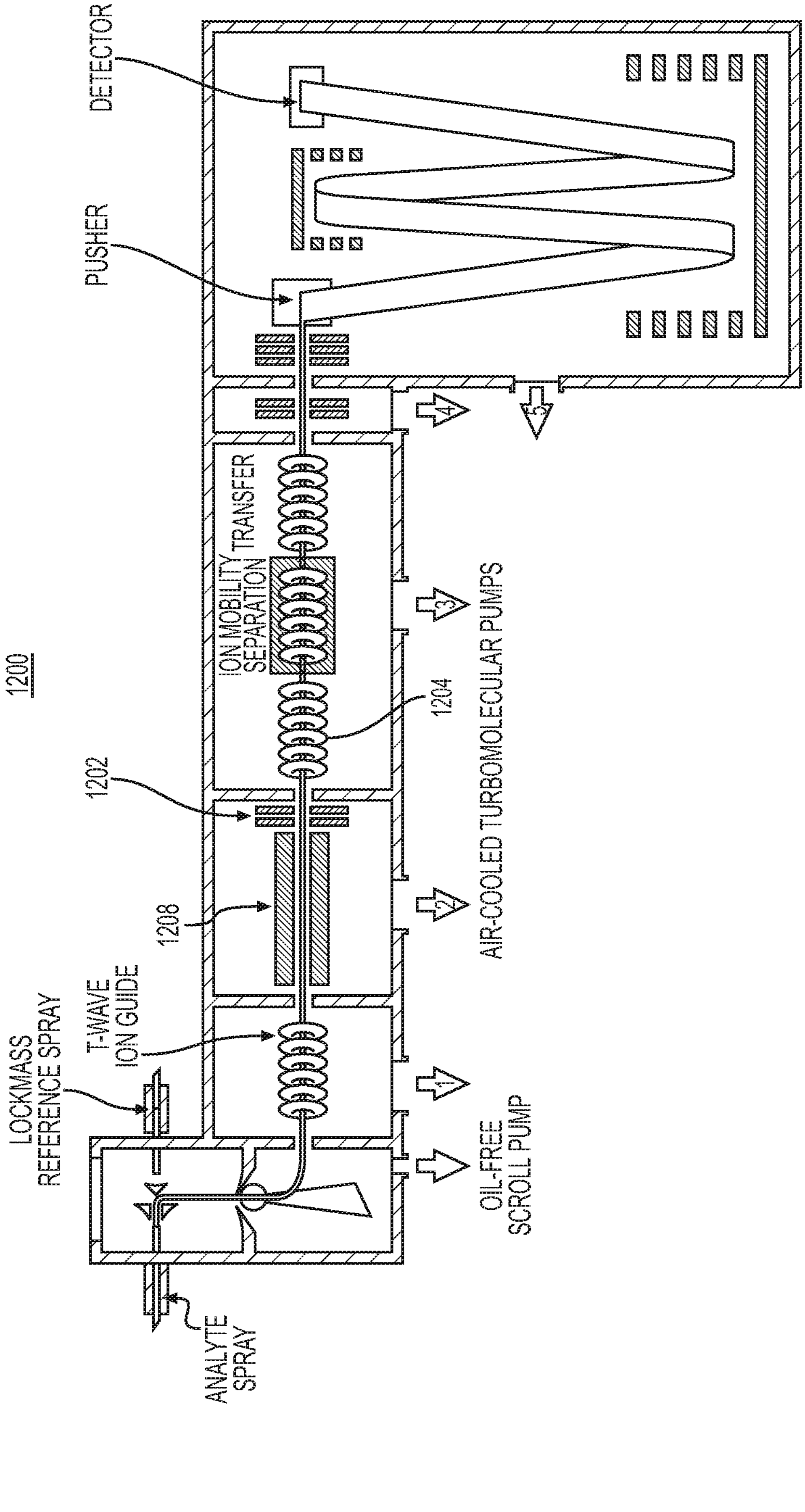
FIG. 12 shows a schematic diagram of a mass spectrometry device in which the existing dynamic range enhancement lens has been reconfigured for SID.

With reference to FIGS. 11 and 12, embodiments of the present disclosure are suitable to implement in commercial mass spectrometry devices. FIG. 11 shows a schematic diagram of a commercial extended mass range ORBITRAP 1100. In accordance with some implementations, the split lens 1002 as shown in FIG. 10A would replace the original transfer multipole 1104 shown in FIG. 11, such that the split lens is located just prior to a C-trap entrance lens. Precursor ions flow from the quadrupole 1108 through the split lens 1106. The split lens 1106 does not perform SID but is instead used for ion gating. Ions can pass through the transfer hexapole (1004) and split lens (1002) in flythrough mode or can be made to collide with the surface of the split lens (1002) to induce disassociation. The product ions and unfragmented precursor ions then flow into the C-Trap 1110. FIG. 12 shows a schematic diagram of a commercial mass spectrometry device 1200. In one implementation, the device 600 shown in FIG. 13, according to an embodiment of the present disclosure, would replace component 1202 of the existing mass spectrometry device 1200. In this implementation, the precursor ions are generated by the existing mass spectrometry device 1200. The precursor ions flow from the quadrupole 1208 through the split lens 600 (serving as the replacement component for 1202) in flythrough mode or are made to collide with the surface by applying a repulsive voltage to the deflector 604 and an attractive voltage to the surface 602 and extractor 606. The product ions and unfragmented precursor ions are then captured by the trap 1204 of the existing mass spectrometry device 1200.

Figure 13:
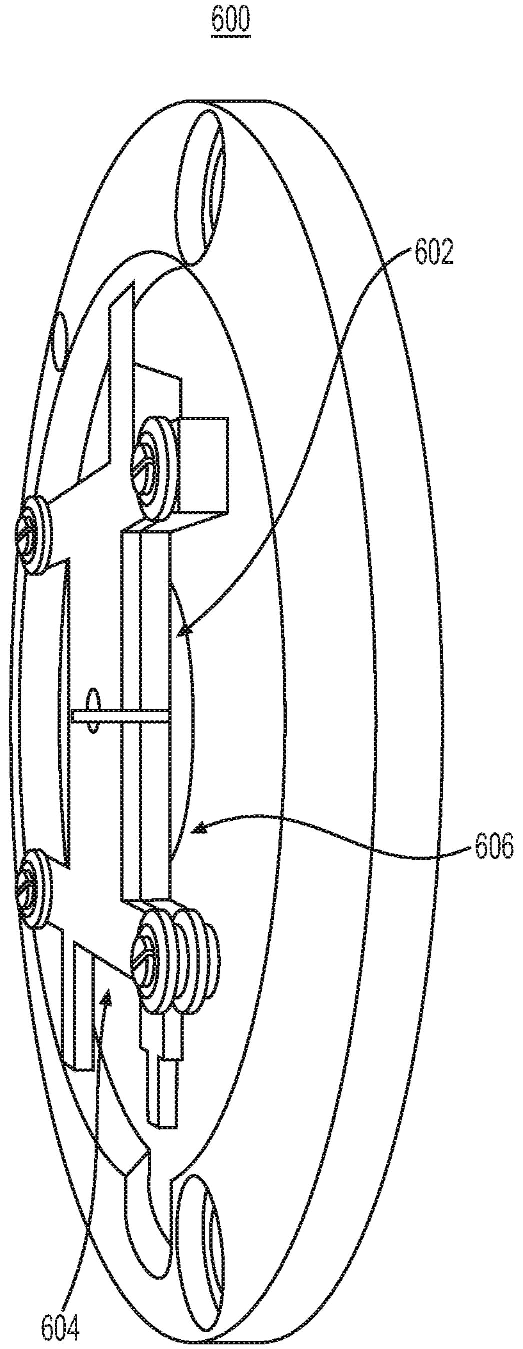
FIG. 13 illustrates a split lens SID according to an embodiment of the present disclosure, on a SYNAPT HDMS (G1) platform.

FIG. 13 illustrates an embodiment of a split lens SID device suitable for use in a commercial mass spectrometer. The surface 602 (not split) is opposite the extractor 606 and the deflector 604. The thickness of this and some other embodiments of the split lens device make it suitable for use in existing mass spectrometers due to its reduced size compared to prior art.

One or more of the functions for changing functional settings, such as electrical properties including, but not limited to attraction, repulsion, applying various potentials to one or more portions of the components of SID devices described above in accordance with certain embodiments may be automatic and/or may be computer-controlled, for example by a processing device of a computer executing computer-readable instructions (e.g., a programmable processor coupled to a memory storing computer-readable instructions which, when executed by the processor, cause a computer to perform specific functions) for automating, coordinating and/or otherwise dictating one or more of the above-mentioned settings, changes, and/or other functions.

The various embodiments described above are provided by way of illustration only and should not be construed to limit the scope of the present disclosure. Those skilled in the art will readily recognize that various modifications and changes may be made to the present disclosure without following the example embodiments and implementations illustrated and described herein, and without departing from the spirit and scope of the disclosure and claims here appended. Therefore, other modifications or embodiments as may be suggested by the teachings herein are particularly reserved.

LIST OF REFERENCES (1) Galhena, A. S.; Dagan, S.; Jones, C. M.; Beardsley, R. L.; Wysocki, V. H. Anal. Chem. 2008, 80, 1425-1436.
(2) Yan, J.; Zhou, M.; Gilbert, J. D.; Wolff, J. J.; Somogyi, A.; Pedder, R. E.; Quintyn, R. S.; Morrison, L. J.; Easterling, M. L.; Pasa-Tolic, L.; Wysocki, V. H. Anal. Chem. 2017, 89, 895-901.
(3) VanAernum, Z. L.; Gilbert, J. D.; Belov, M. E.; Makarov, A. A.; Homing, S. R.; Wysocki, V. H. Anal. Chem. 2019, 91, 3611-3618.
(4) Belov, M. E.; Damoc, E.; Denisov, E.; Compton, P. D.; Homing, S.; Makarov, A. A.; Kelleher, N. L. Anal. Chem. 2013, 85, 11163-11173.
(5) Sauer, E.; Weichenrieder, O. Proc. Natl. Acad. Sci. U.S.A. 2011, 108, 13065-13070.
(6) Vogel, J.; Luisi, B. F. Nat. Rev. Microbiol. 2011, 9, 578.
(7) Kleckner, I. R.; Golinick, P.; Foster, M. P. J. Mol. Biol. 2012, 415, 372-381.
(8) Heck, A. J. Nature Methods 2008, 5, 927.
(9) van den Heuvel, R. H.; Heck, A. J. Curr. Opin. Chem. Biol. 2004, 8, 519-526.
(10) Leney, A. C.; Heck, A. J. J. Am. Soc. Mass Spectrom. 2017, 28, 5-13.
(11) Katta, V.; Chait, B. T. J. Am. Chem. Soc. 1991, 113, 8534-8535.
(12) Ganem, B.; Li, Y. T.; Henion, J. D. J. Am. Chem. Soc. 1991, 113, 6294-6296.
(13) Laganowsky, A.; Reading, E.; Hopper, J. T.; Robinson, C. V. Nat. Protoc. 2013, 8, 639-651.
(14) Fenn, J. B.; Mann, M.; Meng, C. K.; Wong, S. F.; Whitehouse, C. M. *Science* 1989, 246, 64-71.
(15) Allen, S. J.; Eaton, R. M.; Bush, M. F. *Anal. Chem.* 2016, 88, 9118-9126.
(16) Lanucara, F.; Holman, S. W.; Gray, C. J.; Eyers, C. E. *Nat. Chem.* 2014, 6, 281.
(17) Ruotolo, B. T.; Hyung, S.-J.; Robinson, P. M.; Giles, K.; Bateman, R. H.; Robinson, C. V. *Angew. Chem. Int. Ed* 2007, 46, 8001-8004.
(18) Wysocki, V. H.; Jones, C. M.; Galhena, A. S.; Blackwell, A. E. *J. Am. Soc. Mass Spectrom.* 2008, 19, 903-913.
(19) Wysocki, V. H.; Joyce, K. E.; Jones, C. M.; Beardsley, R. L. *J. Am. Soc. Mass Spectrom.* 2008, 19, 190-208.
(20) Chorush, R. A.; Little, D. P.; Beu, S. C.; Wood, T. D.; McLafferty, F. W. *Anal. Chem.* 1995, 67, 1042-1046.
(21) O'Brien, J. P.; Li, W.; Zhang, Y.; Brodbelt, J. S. *J. Am. Chem. Soc.* 2014, 136, 12920-12928.
(22) Giles, K.; Pringle, S. D.; Worthington, K. R., Little, D., Wildgoose, J. L.; Bateman, R. H. *Rapid Commun. Mass Spectrom.* 2004, 18, 2401-2414.
(23) Li, H.; Nguyen, H. H., Ogorzalek Loo, R. R.; Campuzano, I. D. G.; Loo, J. A. *Nat. Chem.* 2018, 10, 139-148.
(24) Lippens, J. L.; Nshanian, M.; Spahr, C.; Egea, P. F.; Loo, J. A.; Campuzano, I. D. G. *J. Am. Soc. Mass Spectrom.* 2018, 29, 183-193.
(25) Zhang, H.; Cui, W.; Wen, J.; Blankenship, R. E.; Gross, M. L. *J. Am. Soc. Mass Spectrom.* 2010, 21, 1966-1968.
(26) Yan, J.; Zhou, M.; Gilbert, J. D.; Wolff, J. J.; Somogyi, A.; Pedder, R. E.; Quintyn, R. S.; Morrison, L. J.; Easterling, M. L.; Pasa-Tolic, L.; Wysocki, V. H. *Anal. Chem.* 2017, 89, 895-901.
(27) Zhou, M.; Yan, J.; Romano, C. A.; Tebo, B. M.; Wysocki, V. H.; Paša-Tolić, L. *J. Am. Soc. Mass Spectrom.* 2018, 29, 723-733.
(28) Fort, K. L.; Van de Waterbeemd, M.; Boll, D.; Reinhardt-Szyba, M.; Belov, M. E.; Sasaki, E.; Zschoche, R.; Hilvert, D.; Makarov, A. A.; Heck, A. J. *Analyst* 2018, 143, 100-105.
(29) Rose, R. J.; Damoc, E., Denisov, E.; Makarov, A.; Heck, A. J. *Nature methods* 2012, 9, 1084.
(30) Syka, J. E.; Coon, J. J.; Schroeder, M. J.; Shabanowitz, J.; Hunt, D. F. *Proc. Natl. Acad. Sci. U.S.A.* 2004, 101, 9528-9533.
(31) Brodbelt, J. S. *Anal. Chem.* 2016, 88, 30-51.
(32) Felitsyn, N.; Kitova, E. N.; Klassen, J. S. *Anal. Chem.* 2001, 73, 4647-4661.
(33) Benesch, J. L.; Aquilina, J. A.; Ruotolo, B. T.; Sobott, F.; Robinson, C. V. *Chem. Biol.* 2006, 13, 597-605.
(34) Jones, C. M.; Beardsley, R. L.; Galhena, A. S.; Dagan, S.; Cheng, G.; Wysocki, V. H. I. *Am. Chem. Soc.* 2006, 128, 15044-15045.
(35) Zhou, M.; Dagan, S.; Wysocki, V. H. Analyst 2013, 138, 1353-1362.
(36) Zhou, M.; Wysocki, V. H. *Acc. Chem. Res.* 2014, 47, 1010-1018.
(37) Quintyn, R. S.; Zhou, M.; Yan, J.; Wysocki, V. H. *Anal. Chem.* 2015, 87, 11879-11886.
(38) Quintyn, Royston S.; Yan, J.; Wysocki, Vicki H. *Chem. Biol.* 2015, 22, 583-592.
(39) Ma, X.; Zhou, M.; Wysocki, V. H. *J. Am. Soc. Mass Spectrom.* 2014, 25, 368-379.
(40) Blackwell, A. E.; Dodds, E. D.; Bandarian, V.; Wysocki, V. H. *Anal. Chem.* 2011, 83, 2862-2865.

(41) Zhou, M.; Dagan, S.; Wysocki, V. H. *Angew. Chem. Int. Ed.* 2012, 51, 4336-4339.
(42) Sahasrabuddhe, A.; Hsia, Y.; Busch, F.; Sheffler, W.; King, N. P.; Baker, D., Wysocki, V. H. *Proc. Natl. Acad. Sci. U.S.A.* 2018, 115, 1268-1273.
(43) Harvey, S. R.; Seffernick, J. T.; Quintyn, R. S.; Song, Y.; Ju, Y.; Yan, J.; Sahasrabuddhe, A. N.; Norris, A.; Zhou, M.; Behrman, E. J.; Lindert, S.; Wysocki, V. H. *Proc. Natl. Acad. Sci. U.S.A.* 2019, 116, 8143-8148.
(44) Song, Y.; Nelp, M. T.; Bandarian, V.; Wysocki, V. H. *ACS Cent. Sci.* 2015, 1, 477-487.
(45) Busch, F.; VanAernum, Z. L.; Ju, Y.; Yan, J.; Gilbert, J. D.; Quintyn, R. S.; Bern, M.; Wysocki, V. H. *Anal. Chem.* 2018, 90, 12796-12801.

What is claimed is:

1. A device for surface-induced dissociation (SID), comprising:
a collision surface;
a deflector configured to guide precursor ions from a pre-SID region to the collision surface; and
an extractor configured to extract ions off the collision surface after collision with the collision surface, wherein the collision surface, the deflector, and the extractor are arranged in a split lens configuration.

2. The device of claim 1, further comprising a radiofrequency (RF) device configured to collect and/or transmit ions extracted directly into the RF device after collision with the collision surface.

3. The device of claim 2, further comprising an RF source configured to apply RF and a voltage source configured to apply DC voltages to the RF device for collecting and/or transmitting ions after surface collision, and wherein the extracted ions are extracted directly into the RF device after surface collision.

4. The device of claim 2, wherein the RF device comprises, at least in part, one or more of a multipole, a collision cell, a stacked ring ion guide, an ion funnel, an ion mobility cell, a 3D quadrupole ion trap, and a linear quadrupole ion trap.

5. The device of claim 1, wherein the split lens configuration comprised of the collision surface, the deflector, and the extractor has a total length along an ion optical axis of no more than 3.25 mm.

6. The device of claim 1, further comprising a voltage source configured to apply a repulsive direct current (DC) voltage to the deflector to guide the precursor ions into the collision surface.

7. The device of claim 1, further comprising a voltage source configured to apply a DC voltage to the collision surface.

8. The device of claim 1 further comprising a voltage source configured to apply an attractive DC voltage or a repulsive DC voltage to the extractor.

9. The device of claim 1, wherein the collision surface is oriented parallel to an ion optical axis defined along the direction of ion movement through a mass spectrometer, or wherein the collision surface is tilted with respect to the ion optical axis.

10. The device of claim 1, wherein the collision surface is substantially flat, cylindrical, half-cylindrical, or conical.

11. The device of claim 1, further comprising a voltage source configured to apply DC voltages to the collision surface, the deflector, and the extractor.

12. The device of claim 1, wherein the split lens configuration comprised of the collision surface, the deflector, and the extractor is operatively coupled to a Fourier transform ion cyclotron resonance (FT-ICR) cell.

13. A method for surface-induced dissociation (SID), comprising:
guiding, by a deflector, precursor ions from a pre-SID region to a collision surface; and
extracting, by an extractor, unfragmented precursors and fragment ions resulting from collision with the collision surface, wherein the collision surface, the deflector, and the extractor are arranged in a split lens configuration.

14. The method of claim 13, comprising applying selected direct current (DC) voltages to the collision surface, the deflector, and the extractor to cause the collisions of the precursor ions with the collision surface and extraction of the unfragmented precursors and fragment ions and wherein the unfragmented precursors and fragment ions resulting from collision with the collision surface are extracted into a radiofrequency (RF) device, and wherein the method further comprises collecting and/or transmitting, by use of the RF device, the unfragmented precursors and fragment ions and wherein selected RF and DC voltages are applied to the RF device to cause the collecting and/or transmitting of the extracted unfragmented precursors and fragment ions.

15. The method of claim 13, wherein the precursor ions comprise antibodies.

16. The method of claim 13, wherein the precursor ions comprise lipids.

17. The method of claim 13, wherein the precursor ions comprise fatty acids.

18. The method of claim 13, wherein the precursor ions comprise peptides.

19. The method of claim 13, wherein the precursor ions comprise sugars.

20. The method of claim 13, wherein the precursor ions comprise metabolites.

21. The method of claim 13, wherein the precursor ions comprise oligomers.

22. The method of claim 13, wherein the precursor ions comprise nucleotides.

23. The method of claim 13, wherein the precursor ions comprise polymers.

24. The method of claim 13, wherein the precursor ions comprise proteins.

25. The method of claim 13, wherein the precursor ions comprise protein small molecule complexes.

26. The method of claim 13, wherein the precursor ions comprise RNA.

27. The method of claim 13, wherein the precursor ions comprise protein RNA complexes.

28. The method of claim 13, wherein the precursor ions comprise protein DNA complexes.

29. The method of claim 13, wherein the precursor ions comprise lipid nanodiscs.

30. The method of claim 13, wherein the precursor ions comprise antibody drug conjugates.

31. The method of claim 13, wherein the precursor ions comprise DNA complexes.

32. The method of claim 13, wherein the precursor ions comprise RNA complexes.

33. The method of claim 13, wherein the precursor ions comprise viruses.

34. The method of claim 13, wherein the precursor ions comprise bacteria.

35. The method of claim 13, wherein the precursor ions comprise small molecules.

36. The method of claim 13, wherein the precursor ions comprise protein complexes.

37. A device for surface-induced dissociation (SID), comprising:

a collision surface;

a deflector configured to guide precursor ions from a pre-SID region to the collision surface; and an ion funnel configured to guide product ions resulting from collision with the collision surface to a post-SID region, wherein electrical potentials are applied to a plurality of electrically tunable lenses of the ion funnel to guide the product ions post-collision.

38. The device of claim 37, wherein the collision surface and the deflector have applied electrical properties such that the collision surface is attractive to precursor ions and the deflector is repulsive to precursor ions to guide the precursor ions to the collision surface.

39. The device of claim 37, wherein the ion funnel comprises a first opening receiving the product ions and a second opening through which the product ions exit, wherein the first opening has a diameter that is larger than the diameter of the second opening.

40. The device of claim 37, wherein the device is configured to be integrated into a mass spectrometer.

41. The device of claim 37, wherein the device is configured to be placed between two mass analyzers.

42. The device of claim 40, wherein the mass spectrometer is a multi-stage mass spectrometer with or without ion mobility.

43. The device of claim 40, wherein the mass spectrometer is a multi-stage mass spectrometer with at least one of collision, electron, and photon-based disassociation.

44. A method for surface-induced dissociation (SID), comprising:

guiding, by a deflector, precursor ions from a pre-SID region to a collision surface; and guiding, by an ion funnel, product ions resulting from collision with the collision surface to a post-SID region.

45. The method of claim 44, comprising applying electrical potentials to the ion funnel to guide the product ions through the ion funnel post-collision.

46. The method of claim 44, comprising applying electrical properties to at least one of the collision surface and the deflector such that the collision surface is attractive to precursor ions and the deflector is repulsive to precursor ions, to guide the precursor ions to the collision surface.

* * * * *